United States Patent [19]
Pfister et al.

[11] 3,818,042
[45] June 18, 1974

[54] XANTHONE CARBOXYLIC ACIDS AND DERIVATIVES

[75] Inventors: Jurg R. Pfister, Los Altos; Ian T. Harrison; John H. Fried, both of Palo Alto, all of Calif.

[73] Assignee: Syntex (U.S.A.), Inc., Palo Alto, Calif.

[22] Filed: June 5, 1972

[21] Appl. No.: 259,853

Related U.S. Application Data

[63] Continuation-in-part of Ser. No. 217,383, Jan. 12, 1972, which is a continuation-in-part of Ser. No. 162,696, July 14, 1971, abandoned.

[52] U.S. Cl.............................. 260/335, 424/283
[51] Int. Cl.............................................. C07d 7/44
[58] Field of Search................................... 260/335

[56] References Cited
UNITED STATES PATENTS
3,706,768   12/1972   Bays.................................. 260/335

*Primary Examiner*—Norma S. Milestone
*Attorney, Agent, or Firm*—Evelyn K. Merker; Walter H. Dreger

[57] ABSTRACT

Compositions containing and methods employing, as the essential ingredient, xanthone carboxylic acid compounds which are useful in the treatment of allergic conditions. Methods for preparing these compounds and compositions are also disclosed. 7-Acetylxanthone-2-carboxylic acid is illustrated as representative of the class.

14 Claims, No Drawings

XANTHONE CARBOXYLIC ACIDS AND DERIVATIVES

This is a continuation-in-part of application Ser. No. 217,383, filed Jan. 12, 1972 which is a continuation-in-part of application Ser. No. 162,696, filed July 14, 1971 and now abandoned.

The present invention is directed to xanthone carboxylic acid compounds and to compositions containing and methods utilizing these compounds as the essential ingredient in the treatment of symptoms associated with allergic manifestations, for example, asthmatic conditions.

In a first aspect, the present invention relates to novel xanthone carboxylic acid compounds selected from those represented by the following formulas:

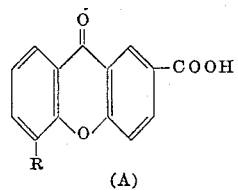 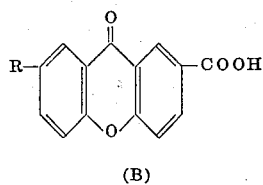

(A)  (B)

and the pharmaceutically acceptable, non-toxic esters, amides and salts thereof; wherein each R is a group selected from those of the formulas:

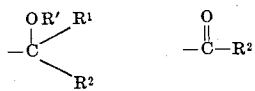

in which R' is hydrogen, lower alkyl, cycloalkyl, tetrahydrofuran-2-yl, tetrahydropyran-2-yl, tetrahydropyran-4-yl, 4-alkoxytetrahydropyran-4-yl, or carboxylic acyl containing up to 12 atoms, and $R^1$ is hydrogen, lower alkyl or cycloalkyl, $R^2$ is hydrogen; lower alkyl; cycloalkyl; phenyl; substituted phenyl in which the substituent is halo, lower alkyl, lower alkoxy, lower alkylthio, trifluoromethyl, or cyano; or a monocyclic aromatic heterocyclic group having five or six total members, one or two of which are selected from nitrogen, oxygen, and sulfur.

Thus included within the scope of the present invention are the C–5 and C–7 secondary and tertiary 1-hydroxyalkyl substituted xanthone-2-carboxylic acid compounds and the hydroxy esters (preferably acetoxy) and hydroxy ethers (preferably methoxy) thereof and the C–5 and C–7 acyl substituted xanthone-2-carboxylic acid compounds.

In a second aspect, the present invention is directed to a method useful for relieving symptoms associated with allergic manifestations such as are brought about by antigen-antibody (allergic) reactions. In the relief of these symptoms, the method hereof serves to inhibit the effects of the allergic reaction when administered in an effective amount. While not intending to be bound by any theoretical mechanism of action, the method hereof is believed to operate by inhibiting the release and/or the action of toxic products, e.g. histamine, 5-hydroxytryptamine, slow releasing substance (SRS-A), and other, which are produced as a result of a combination of specific antibody and antigen (allergic) reaction. These properties make the subject compounds particularly useful in the treatment of various allergic conditions.

This aspect of the present invention thus relates to a method useful for inhibiting the effects of the allergic reaction which comprises administering an effective amount of a compound selected from those represented by the following formulas:

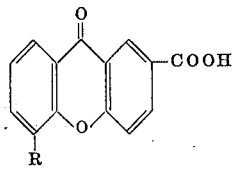 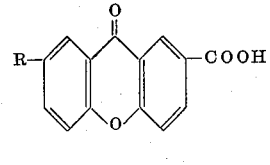

(A)  (B)

and the pharmaceutically acceptable non-toxic esters, amides, and salts thereof; wherein each R is a group selected from those of the formulas:

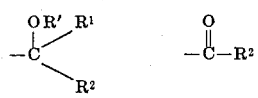

in which R' is hydrogen, lower alkyl, cycloalkyl, tetrahydrofuran-2-yl, tetrahydropyran-2-yl, tetrahydropyran-4-yl, 4-alkoxytetrahydropyran-4-yl, or carboxylic acyl containing up to 12 carbon atoms, and $R^1$ is hydrogen, lower alkyl or cycloalkyl, and $R^2$ is hydrogen; lower alkyl; cycloalkyl; phenyl, substituted phenyl in which the substituent is halo, lower alkyl, lower alkoxy, lower alkylthio, trifluoromethyl, or cyano; or a monocyclic aromatic heterocyclic group having five or six total members, one or two of which are selected from nitrogen, oxygen, and sulfur, or a pharmaceutically acceptable non-toxic composition incorporating said compounds, esters, amides or salts as an essential ingredient.

The compounds of the present invention are also smooth muscle relaxants, e.g., bronchial dilators, and are therefore useful in the treatment of conditions in which such agents may be indicated, as for instance, in the treatment of broncho constriction. The compounds of the present invention are also vasodilators and are therefore useful in the treatment of conditions in which such agents may be indicated, as for instance, in renal and cardiac disorders.

The present invention, in a third aspect, is directed to pharmaceutical compositions useful for inhibiting the effects of the allergic reactions comprising an effective amount of a compound selected from those represented by the following formulas:

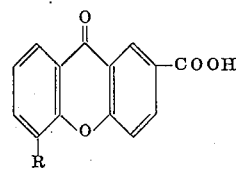 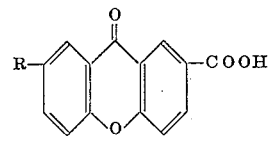

and the pharmaceutically acceptable esters, amides, and salts thereof; wherein each R is a group selected from those of the formulas:

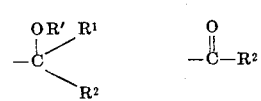

in which R' is hydrogen, lower alkyl, cycloalkyl, tetrahydrofuran-2-yl, tetrahydropyran-2-yl, tetrahydropyran-4-yl, 4-alkoxytetrahydropyran-4-yl, or carboxylic acyl containing up to 12 carbon atoms, and $R^1$ is hydrogen, lower alkyl or cycloalkyl, and $R^2$ is hydrogen; lower alkyl; cycloalkyl; phenyl; substituted phenyl in which the substituent is halo, lower alkyl, lower alkoxy, lower alkylthio, trifluoromethyl, or cyano; or a monocyclic aromatic heterocyclic group having five or six total members, one or two of which are selected from nitrogen, oxygen, and sulfur, in admixture with a pharmaceutically acceptable nontoxic carrier.

In the practice of the method of the present invention, an effective amount of a compound of the present invention or pharmaceutical compositions thereof, as defined above, is administered via any of the usual and acceptable methods known in the art, either singly or in combination with another compound or compounds of the present invention or other pharmaceutical agents, such as antibiotics, hormonal agents, and so forth. These compounds or compositions can thus be administered orally, topically, parenterally, or by inhalation and in the form of either solid, liquid, or gaseous dosages including tablets, suspensions, and aerosols, as discussed in more detail hereinafter. The administration can be conducted in single unit dosage form with continuous therapy or in single dose therapy ad libitum. In the preferred embodiments, the method of the present invention is practiced when relief of symptoms is specifically required, or perhaps, imminent; however, the method hereof is also usefully practiced as continuous or prophylactic treatment.

In view of the foregoing as well as in consideration of the degree or severity of the condition being treated, age of subject, and so forth, all of which factors being determinable by routine experimentation by one skilled in the art, the effective dosage in accordance herewith can vary over a wide range. Generally, an effective amount ranges from about 0.005 to about 100 mg. per kg. of body weight per day and preferably from about 0.01 to about 100 mg. per kg. of body weight per day. In alternate terms, an effective amount in accordance herewith generally ranges from about 0.5 to about 7000 mg. per day per subject.

Useful pharmaceutical carriers for the preparation of the compositions hereof, can be solids, liquids, or gases. Thus, the compositions can take the form of tablets, pills, capsules, powders, sustained release formulations, solutions, suspensions, elixirs, aerosols, and the like. The carriers can be selected from the various oils including those of petroleum, animal, vegetable, or synthetic origin, for example, peanut oil, soybean oil, mineral oil, sesame oil, and the like. Water, saline, aqueous dextrose, and glycols are preferred liquid carriers, particularly for injectable solutions. Suitable pharmaceutical excipients include starch, cellulose, talc, glucose, lactose, sucrose, gelatin, malt, rice, flour, chalk, silica gel, magnesium carbonate, magnesium stearate, sodium stearate, glyceryl monosterate, sodium chloride, dried skim milk, glycerol, propylene glycol, water, ethanol, and the like. Suitable pharmaceutical carriers and their formulation are described in "Remingtons Pharmaceutical Sciences" by E. W. Martin. Such compositions will, in any event, contain an effective amount of the active compound together with a suitable amount of carrier so as to prepare the proper dosage form for proper administration to the host.

The compounds of the present invention demonstrate activity as inhibitors of the effects of the allergic reaction as measured by tests indicative of such activity involving passive cutaneous anaphylaxis as substantially described, for example, by J. Goose et al., *Immunology*, 16, 749 (1969).

Certain of the compounds of the present invention can be prepared in accordance with the following reaction sequence:

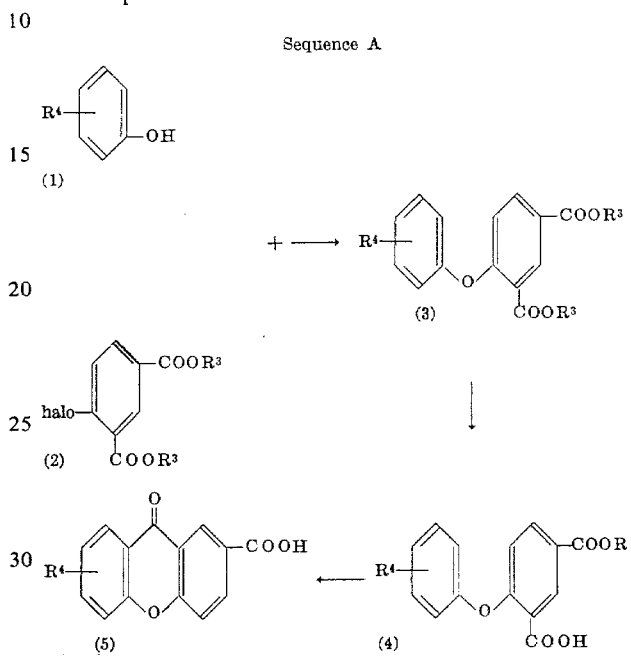

Sequence A wherein
$R^3$ is lower alkyl, preferably methyl;
$R^4$ is acyl; and
halo is bromo, chloro, fluoro, or iodo, preferably bromo.

With reference to the above sequence, an ortho or para substituted ($R^4$) phenol (1) is condensed with the 1,3-dicarbo(lower)alkoxy-4-halobenzene compound (2) in the presence of cuprous oxide optionally in organic liquid reaction medium, preferably an organic amide such as dimethyl acetamide, dimethyl formamide, N-methyl pyrrolidone, tetramethylurea, and so forth, to prepare the corresponding 1,3-dicarbo(lower)alkoxy-4- (o- or p-subsituted phenyloxy)-benzene compound (3).

The reaction is preferably conducted in an inert organic reaction medium, such as those listed above, or suitable mixtures of one or more of such medium. The reaction is further conducted at temperatures ranging from about 80° to about 220°C, preferably about from 120° to 200°C, and for a period of time sufficient to complete the reaction, ranging from about two hours to about 24 hours.

The reaction consumes the reactants on the basis of one mole of the substituted phenol per mole of the dicarbo(lower)carboxyhalobenzene per half mole of cuprous oxide. However, the amounts of the reactants to be employed are not critical, some of the desired compound (3) product being obtained when employing any proportions thereof. In the preferred embodiments, the reaction is conducted by reacting from about one to about three moles of the substituted phenol compound with about from one to about 1.2 moles of the dicarbo- (lower)carboxyhalobenzene compound in the presence of from about 0.5 to about 0.6 moles of the cuprous oxide. The inert organic reaction medium, if employed, is used in solvent amounts.

Thereafter, the prepared compound (3) is base hydrolyzed to give the corresponding 1,3-dicarboxy-4-(o- or p-substituted phenyloxy)-benzene (4). The base hydrolysis conditions can be any employed conventionally in the art. Generally, the hydrolysis reaction is conducted using an alkali metal hydroxide at about 50° to about 90°C and for a period of time sufficient to complete the reaction, ranging from about 15 minutes to about 60 minutes, preferably in the presence of inert organic reaction media such as those normally employed in organic chemical reactions of this type, e.g., aqueous alkanol solutions. Although two moles of base are required per mole of compound (3), the amounts employed are not critical to produce the desired hydrolysis. Preferably from about 3 to about 5 moles of base are employed per mole of compound (3) and the reaction media, if employed, is used in solvent amounts.

The thus prepared diacid compound (4) is then cyclized with phosphoryl chloride, thionyl chloride, sulfuric acid, hydrogen fluoride, or preferably, polyphosphoric acid (PPA), to give the corresponding 5- or 7-substituted xanthone-2-carboxylic acid compound (5). The reaction is preferably, but optionally, conducted in an inert organic reaction medium including those usually employed in organic chemical reactions, such as dimethylsulfoxide, sulfolane, benzene, toluene, and so forth. The reaction is further conducted at temperatures ranging from about 60° to about 180°C, and for a period of time sufficient to complete the reaction ranging from about 15 minutes to about 90 minutes.

Although the reaction consumes the reactants on the basis of one mole of compound (4) per mole of cyclizing reagent, the reaction can be performed using any proportions of reactants. In the preferred embodiments, however, the reaction is conducted using from about 20 to about 50 moles of the cyclizing reagent per mole of starting compound (4).

The compounds of the present invention in the 5- or 7-(secondary hydroxyalkyl)-xanthone-2-carboxylic acid series are prepared from the corresponding 5- or 7-acyl compounds, prepared as described above. The 5- or 7-acylxanthone-2-carboxylic acids are converted to the corresponding acid ester such as with alkyl iodide under basic condition. The acyl ester is then reduced such as with sodium borohydride to give the 5- or 7-(secondary hydroxyalkyl)-xanthone-2-carboxylic acid ester which can be hydrolyzed to the acid.

The 5- or 7-(tertiary hydroxyalkyl)-xanthone-2-carboxylic acids hereof are prepared by treating the 5- or 7-acylxanthone carboxylic acid esters with a lower alkyl or cycloalkyl Grignard reagent followed by hydrolysis of the ester.

Certain of the compounds of the present invention can be prepared in accordance with the following reaction sequence:

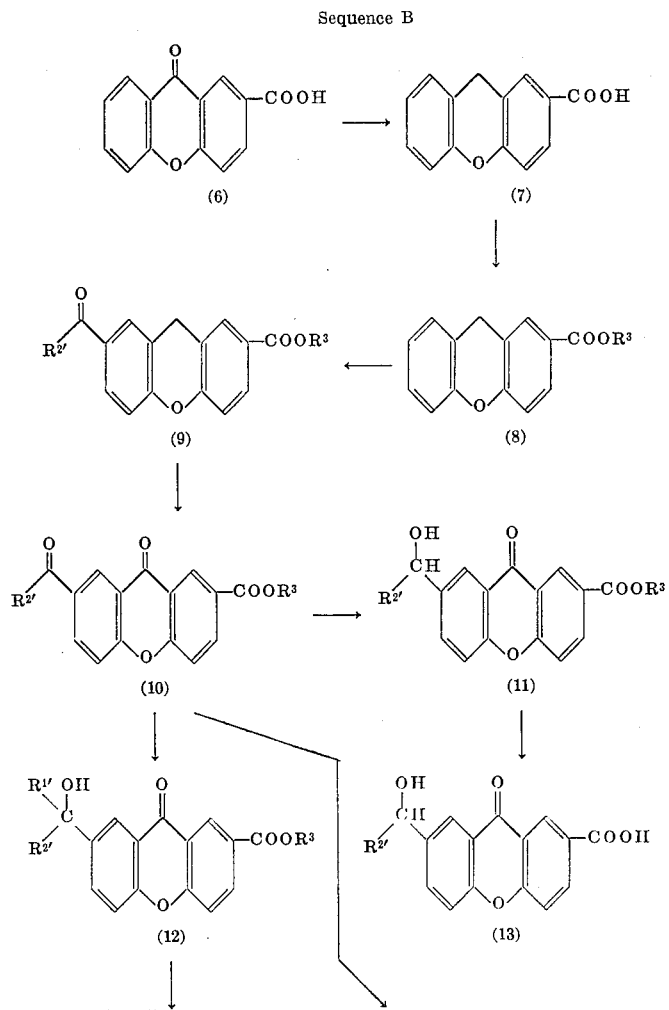

Sequence B

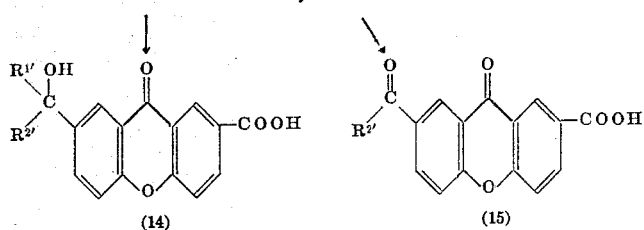

wherein $R^{1'}$ is $R^1$ exclusive of hydrogen, $R^{2'}$ is $R^2$ exclusive of hydrogen, and $R^3$ is lower alkyl, preferably methyl.

With reference to the above reaction sequence, xanthone-2-carboxylic acid (6) prepared as described above, is reduced such as with potassium hydroxide in hydrazine, zinc and potassium hydroxide in ethanol, lithium aluminum hydride, and like reduction methods to prepare the corresponding xanthene-2-carboxylic acid (7). This compound is conventionally esterified ($R^3$) by means known to those skilled in the art, for example, by treatment of the acid with diazoalkane or with alkanol and sulfuric acid. The resultant ester (8) is then acylated under Friedel-Crafts conditions with an acid chloride in the presence of aluminum chloride to give the corresponding 7-acyl compound (9).

The resultant compound (9) is oxidized, such as under known Jones conditions, to give the corresponding 7-acylxanthone-2-carboxylate esters (10), which can be hydrolyzed, as described above, to give the 7-acylxanthone-2-carboxylic acid compounds (15).

Compounds (10) can also be reduced, such as by the known method using sodium borohydride, to give the corresponding 7-(secondary hydroxyalkyl)-xanthone-2-carboxylate esters (11) which can be hydrolyzed to the acid products (13).

Compounds (10) can also be treated with alkyl or cycloalkyl (i.e. $R^{1'}$) Grignard reagent, under known Grignard reaction conditions, to give the corresponding 7-(tertiary hydroxyalkyl)-xanthone-2-carboxylate esters (12) which can be hydrolyzed to the acid products (14).

Alternatively, the compounds of formula (9) can be reduced or treated with Grignard reagent, as described above, to prepare the corresponding 7-(secondary and tertiary hydroxyalkyl) xanthene compounds. These can be acylated via conventional secondary and tertiary acylation techniques to give the corresponding esters which are oxidized under Jones conditions to prepare the corresponding 7-(secondary and tertiary acyloxyalkyl)-xanthone-2-carboxylic acid esters which, when hydrolyzed under base conditions, gives the corresponding 7-(secondary and tertiary hydroxyalkyl)-xanthone-2-carboxylic acid products (13 and 14).

Certain of the compounds of the present invention can be prepared in accordance with the following reaction sequence:

Sequence C

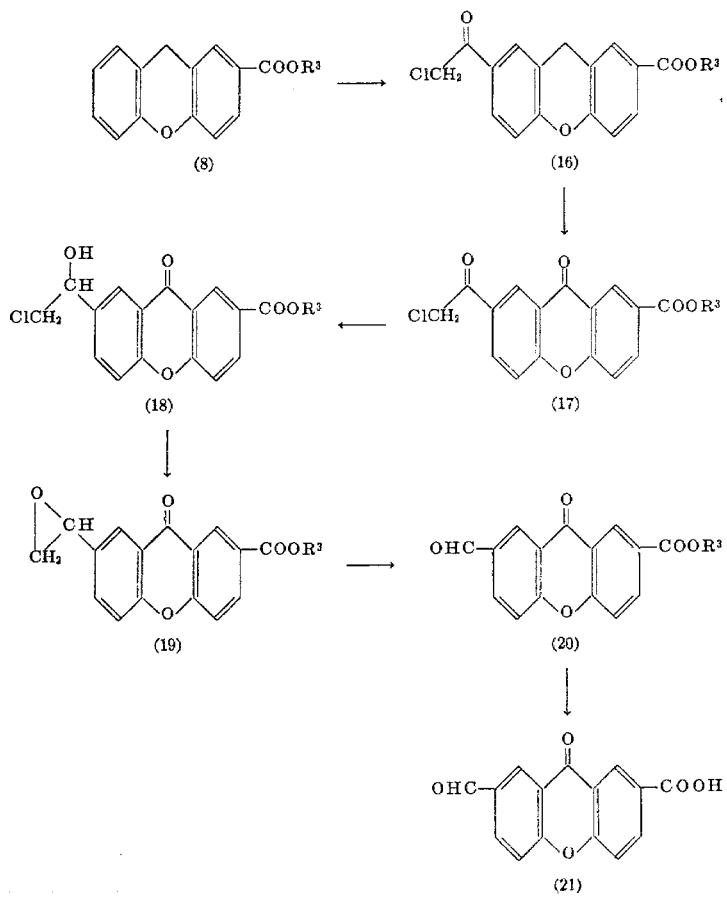

With reference to the above reaction sequence, xanthene-2-carboxylic acid ester (8) is reacted with chloroacetyl chloride under Friedel-Crafts conditions to give compound (16). This compound is then oxidized as described above to give the corresponding xanthone (17) which is reduced as described above to give the hydroxy compound (18). The resultant compound is treated with sodium hydride in dimethylformamide to oxido the exido derivative (19). This compound is treated with periodic acid or the perchloric acid and sodium periodate to give the 7-formylxanthone-2-carboxylate ester (20) which is hydrolyzed to the acid product (21).

An alternative method for the preparation of certain of the C-5 substituted compounds hereof is illustrated by the following sequence:

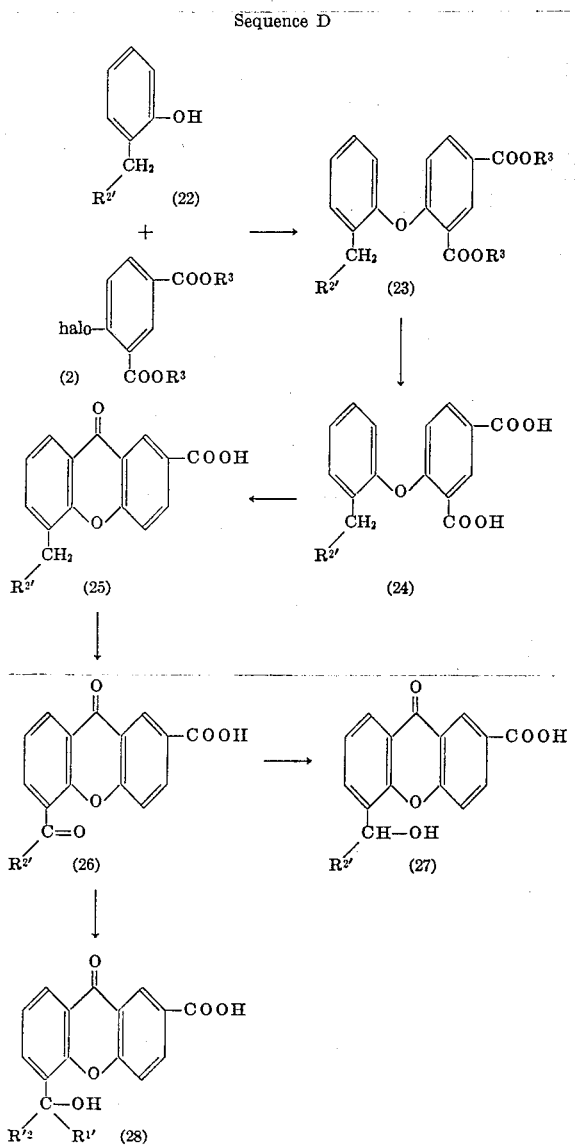

wherein each of $R^{1'}$, $R^{2'}$, $R^{3'}$, and halo is as above defined.

With reference to the above reaction sequence, the 5-substituted-xanthone-2-carboxylic compounds (25) are prepared following the above reaction Sequence A (1+2 → 3 → 4 → 5) with the respective starting compounds (22). The resultant compounds (25) or their esters are oxidized with chromium trioxide in acetic acid-acetic anhydride to give the 5-acyl compounds (26) which are reduced or treated with Grignard reagent as above described to give the respective 5-(secondary and tertiary hydroxyalkyl)-xanthone-2-carboxylic acid products (27 and 28). Alternative to the above procedure, the 5-substituted xanthone-2-carboxylic acid (25) can be converted to its corresponding ester and it treated with N-bromosuccinimide to prepare the corresponding 5-(substituted bromomethyl) compound (i.e.,

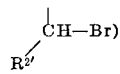

which can be converted to the corresponding alcohol upon treatment with aqueous base, to give the product acids (27).

The compound 5-methylxanthone-2-carboxylic acid, prepared as described in Sequence A (1 → 5) from o-methylphenol, can be oxidized under known Thiele conditions to give the corresponding 5-formylxanthone-2-carboxylic acid. This method is also useful for preparing 7-formylxanthone-2-carboxylic acid.

A particularly preferred method for the preparation of certain of the compounds hereof is represented as follows:

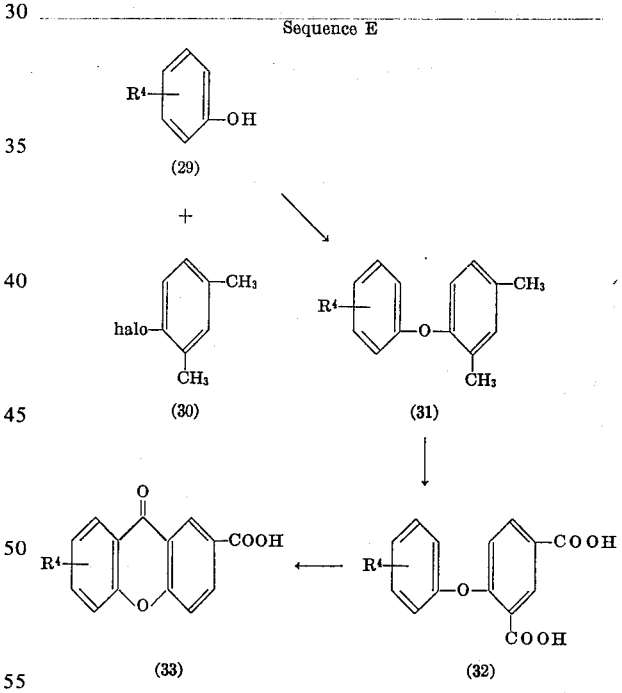

wherein $R^4$ is as defined above.

With reference to the above sequence, an appropriate phenol (29) is treated with 1,3-dimethyl-4-halo-(preferably iodo) benzene (30), as described above, to prepare the corresponding 1,3-dimethyl-4-phenyloxy benzene (31) This compound is then oxidized such as with potassium permanganate in aqueous t-butanol, to give the corresponding 1,3-dicarboxy-4-phenyloxy-benzene (32). This compound is then cyclized, as described above, to give the corresponding xanthone-2-carboxylic acid (33) which can be modified as described above to prepare the product C-5 or C-7 substituted compounds hereof.

The carboxylic acyl esters of the secondary and tertiary hydroxy alkyl substituted compounds (i.e. R'=carboxylic acyl) are prepared as described above or by secondary and tertiary alcohol esterification methods known per se. One such method involves treating the products represented by Formulas (13) and (27) with a carboxylic acid chloride or carboxylic acid anhydride in the presence of a base, preferably pyridine, at temperatures ranging from about 60° to about 90°C and for a period of time ranging from about 1 to about 2 hours to give the corresponding secondary carboxylic acyloxy alkyl substituted xanthone-2-carboxylic acid compound. Likewise, by treating the products of Formulas (14) and (28) with a carboxylic acid chloride and dimethylaniline in tetrahydrofuran or with a mixed carboxylic acid, p-toluenesulfonic acid anhydride, the corresponding tertiary carboxylic acyloxy alkyl substituted xanthone-2-carboxylic acid compounds are prepared. See Harrison and Harrison, *Compendium of Organic Synthetic Methods*, Wiley-Interscience, New York (1971) 281 and 2 and the references cited thereon.

The alkyl and cycloalkyl ethers of the secondary hydroxyalkyl series (R'=alkyl, cycloalkyl) are prepared by treatment of the xanthone acid ester with the appropriate alkyl or cycloalkyl halide and sodium hydride in, e.g. dimethylformamide, followed by hydrolysis, as described above. The etherification reaction is conducted at from about 50° to about 80°C and for from about 1 to about 5 hours. In the tertiary alcohol series, the alkyl and cycloalkyl ethers are prepared by treating the precursor acyl compound, e.g. 7-acetylxanthone-2-carboxylic acid ester, under Grignard conditions, as described above, but in the presence of appropriate alkyl or cycloalkyl iodide or bromide and hexamethylphosphoramide to concomitantly afford the alkyl or cycloalkyl ether of the tertiary alcohol, followed by hydrolysis as described above. See Harrison and Harrison, *Compendium of Organic Synthetic Methods*, Wiley-Interscience, New York (1971), 323 and the references cited thereon.

The t-butoxy ethers are prepared by treating the alcohol with isobutene in the presence of boron trifluoride and phosphoric acid in, e.g. methylene chloride, at temperatures of from about 10 to about 30°C and for from 10 to about 24 hours, or more, followed by hydrolysis of the acid ester group, as described above.

The tetrahydrofuran-2-yloxy and tetrahydropyran-2-yloxy ethers in the secondary and tertiary alcohol series are prepared by treatment with dihydrofuran or dihydropyran in the presence of p-toluenesulfonic acid and organic reaction medium, e.g. benzene, to about room temperature up to reflux, for from about two to about five days, followed by hydrolysis of the acid ester, as described above.

The 4-alkoxytetrahydropyran-4-yloxy ethers in the secondary and tertiary alcohol series are prepared by treatment of the alcohol with 4-alkoxy-5,6-dihydro-2H-pyran, as described above for the preparation of the furanyl and pyranyl ethers, followed by acid ester hydrolysis. Treatment of the 4-alkoxytetrahydropyran-4-yloxy ether with aluminum chloride and lithium aluminum hydride in organic reaction medium affords the corresponding tetrahydropyran-4-yloxy ethers which are oxidized to give the corresponding ethers in the xanthone acid series. The latter can be directly prepared by treating the alcohol with 4-bromotetrahydropyran and base. See Harrison and Harrison, *Compendium of Organic Synthetic Methods*, Wiley-Interscience, New York (1971) 129 and the references cited thereon.

The acid esters of the xanthone-2-carboxylic acids hereof are prepared as described above (e.g. 7 → 8) upon treatment of the acid with ethereal diazoalkane such as diazomethane and diazoethane or with the desired lower alkyl iodide in the presence of lithium carbonate at room temperature or with the desired lower alkanol in the presence of a trace of sulfuric acid at reflux. The glycerol esters are prepared by treating the acid with thionyl chloride followed by treatment with a suitably protected ethylene glycol or propylene glycol (e.g., solketal) in pyridine, and hydrolyzing the protecting group of the ester thus formed with dilute acid. In the sulfo series, the carboxylic acid esters are preferably prepared with the desired lower alkanol in the absence of acid catalyst.

The amides of the xanthone-2-carboxylic acids hereof are prepared by treatment of the acids with thionyl chloride followed by treatment with anhydrous ammonia, alkyl, amine, dialkylamine, dialkylaminoalkylamine, alkoxyalkylamine, or phenethylamine.

The salts of the xanthone-2-carboxylic acids hereof are prepared by treating the corresponding acids with pharmaceutically acceptable base. Representative salts derived from such pharmaceutically acceptable bases are sodium, potassium, lithium, ammonia, calcium, magnesium, ferrous, ferric, zinc, manganous, aluminum, manganic, the salts of trimethylamine, triethylamine, tripropylamine, β-(dimethylamino)ethanol, triethanolamine, β-(diethylamino)ethanol, arginine, lysine, histidine, N-ethylpiperidine, hydrabamine, choline, betaine, ethylenediamine, glucosamine, methyl glucamine, theobromine, purines, piperazine, piperidine, polyamine resins, caffeine, procaine or the like. The reaction is conducted in an aqueous solution, alone or in combination with an inert, water miscible organic solvent, at a temperature of from about 0°C to about 100°C, preferably at room temperature. Typical inert, water miscible organic solvents include methanol, ethanol, isopropanol, butanol, acetone, dioxane, or tetrahydrofuran. When divalent metal salts are prepared, such as the calcium salts or magnesium salts of the acids the free acid starting material is treated with about one half molar equivalent of pharmaceutically acceptable base. When the aluminum salts of the acids are prepared about one third molar equivalent of the pharmaceutically acceptable base are employed.

In the preferred embodiment of the present invention, the calcium salts and magnesium salts of the acids are prepared by treating the corresponding sodium or potassium salts of the acids with at least one half molar equivalent of calcium chloride or magnesium chloride, respectively, in an aqueous solution, alone or in combination with an inert water miscible organic solvent, at a temperature of from about 20°C to about 100°C.

In the preferred embodiment of the present invention, the aluminum salts of the acids are prepared by treating the acids with at least one third molar equivalent of an aluminum alkoxide, such as aluminum triethoxide, aluminum tripropoxide and the like, in a hydrocarbon solvent, such as benzene, xylene, cyclohexane, and the like at a temperature of from about 20°C to about 115°C.

The starting compounds for use in the present invention are known and can be prepared in accordance with known procedures. Thus, the 1,3-dicarbo(lower)alkoxy-4-halobenzene starting compounds (2) are conveniently prepared by oxidizing 1,3-dimethyl-4-halobenzene (4-halo-m-xylene) with potassium permanganate, as described above (31 →32), followed by conventional esterification. The o- or p-acylphenols (1) are conveniently prepared by performing a Friedel-Crafts reaction with phenol to give the desired acylphenol compounds which can be separated such as by steam distillation. The acyl group thereof is reduced with platinum oxide or palladium catalyst in the presence of perchloric acid in ethanol. Lower alkoxyphenylcarboxylic acid chloride acylating agents for the preparation of alkoxyphenylcarbonylphenol starting compounds, are prepared, for example, by selectively esterifying hydroxybenzoic acid with methanol and a trace of sulfuric acid or with lithium carbonate and methyl halide in dimethylformamide. The resultant hydroxybenzoate ester is then conventionally alkylated with lower alkylhalide and potassium carbonate followed by selective hydrolysis of the ester of the carboxylic acid group and conversion to the acid chloride with, e.g., thionyl chloride.

In the present specification and claims, by the term "lower alkyl" is intended a lower alkyl group containing one to eight carbon atoms including straight and branched chain groups, for example, methyl, ethyl, n-propyl, isopropyl, n-butyl, isobutyl, sec-butyl, t-butyl, n-pentyl, isopentyl, sec-pentyl, t-pentyl, n-hexyl, n-pentyl, n-octyl, isooctyl. The term "cycloalkyl" includes cyclopropyl, cyclobutyl, cyclopentyl, and cyclohexyl. By the term "lower alkoxy" is intended the group "O-lower alkyl"wherein "lower alkyl" is as defined above. By the term "lower alkylthio" is intended the group "S-lower alkyl" wherein "lower alkyl" is as defined above. The term "substituted phenyl" includes p-substituted phenyl. The term "monocyclic aromatic heterocyclic group" includes pyridyl, pyridazinyl, pyrimidinyl, pyrazinyl, imidozolyl, furanyl, thiophenyl, pyrrolyl, isoxazolyl, and oxazolyl.

By the term "pharmaceutically acceptable, non-toxic esters, amides, and salts" is respectively intended an alkyl or glycerol ester; an unsubstituted, monoalkyl, dialkyl, dialkylaminoalkyl, alkoxyalkyl, or phenethyl substituted amide and a salt as defined above.

The term "carboxylic acyl," as used herein, refers to those physiologically acceptable acyl groups, conventionally employed in the pharmaceutical art, preferably hydrocarbon carboxylic acyl. Included are acetate, propionate, butyrate, trimethylacetate, valerate, methylethylacetate, caproate, t-butylacetate, 3-methylpentanoate, enanthate, caprylate, triethylacetate, pelargonate, decanoate, undecanoate, benzoate, phenylacetate, diphenylacetate, cyclopantylpropionate, methoxyacetate, aminoacetate, diethylaminoacetate, trichloracetate, β-chloropropionate, bicyclo[2.2.2]octane-1-carboxylate, adamantoate, dihydrogen phosphate, dibenzyl phosphate, sodium ethyl phosphate, sodium sulfate, sulfate, and the like.

In the secondary and tertiary hydroxyalkyl series the compounds may possess a chiral center. The methods hereof generate each of the d and l and dl forms and each is thus included within the scope hereof. If desired, the isomers can be separated by conventional means such as forming the alkaloid salts of the products and employing fractional crystallization.

The nomenclature herein is employed in accordance with *Chemical Abstracts* 56 Subject Index (1962, January-June).

The following examples illustrate the method by which the present invention can be practiced.

EXAMPLE 1

A mixture of 3.9 g. of 1,3-dicarbomethoxy-4-bromobenzene, 2.85 g. of p-acetylphenol, 1.1 g. of cuprous oxide, and 25 ml. of tetramethylurea is heated to 165°C and maintained thereat with stirring for 18 hours under a nitrogen atmosphere. After this time, the reaction mixture is diluted with water and extracted with ether. The extracts are dried and evaporated to give 1,-3-dicarbomethoxy-4-(p-acetylphenyloxy)-benzene.

1,3-Dicarbomethoxy-4-(p-acetylphenyloxy)-benzene (3.5 g.) is dissolved in 50 ml. of ethanol and the mixture treated with 15 ml. of 4 percent aqueous potassium hydroxide solution. The reaction mixture is refluxed for 30 minutes, concentrated under reduced pressure, and acidified with dilute hydrochloric acid. The solid collected upon filtration is washed with water and dried to give 1,3-dicarboxy-4-(p-acetylphenyloxy)-benzene which is recrystallized from ethanol-water.

A solution of 3.2 g. of 1,3-dicarboxy-4-(p-acetylphenyloxy)-benzene in 30 ml. of concentrated sulfuric acid is warmed to 80°C. The mixture is then allowed to stand at room temperature for 16 hours after which time it is poured into ice water, filtered, washed and dried to give 7-acetylxanthone-2-carboxylic acid which is recrystallized from tetrahydrofuran-ethanol. The foregoing method can also be employed using an alternative 1,3-carboloweralkoxy-4-halo starting compound such as 1,3-dicarbomethoxy-4-chloro or iodo benzene, 1,3-dicarboethoxy-4-fluoro benzene, 1,3-dicarboethoxy-4-bromo benzene, and the like, with similar results.

In a similar manner, the above described reactions can be conducted utilizing an alternate p-acyl phenol starting material to give the corresponding 7-acyl-xanthone-2-carboxylic acid products, e.g., 7-formylxanthone-2-carboxylic acid, 7-propionylxanthone-2-carboxylic acid, 7-n-butyrylxanthone-2-carboxylic acid, 7isobutyrylxanthone-2-carboxylic acid, 7-n-pentanoylxanthone-2-carboxylic acid, 7-isopentanoylxanthone-2-carboxylic acid, 7-sec-pentanoylxanthone-2-carboxylic acid, 7-t-pentanoylxanthone-2-carboxylic acid, 7-hexanoylxanthone-2-carboxylic acid, 7-heptanoylxanthone-2-carboxylic acid, 7-octanoylxanthone-2-carboxylic acid, 7-nonanoylxanthone-2-carboxylic acid, 7-cyclopropylcarbonylxanthone-2-carboxylic acid, 7-cyclobutylcarbonylxanthone-2-carboxylic acid, 7-cyclopentylcarbonylxanthone-2-carboxylic acid, 7-cyclohexylcarbonylxanthone-2-carboxylic acid, 7-haloacetylxanthone-2-carboxylic acid, 7-benzoylxanthone-2-carboxylic acid, 7-substituted benzoylxanthone-2-carboxylic acid, and 7-heterocycliccarbonylxanthone-2-carboxylic acid.

The procedure of Example 1 is repeated using the appropriate o-acyl phenol starting compounds to prepare the corresponding 5-substituted xanthone-2-carboxylic acid, to wit, 5-formylxanthone-2-carboxylic acid, 5-acetylxanthone-2-carboxylic acid, 5-propionylxanthone-2-carboxylic acid, 5-n-butyrylxanthone-2-carboxylic acid, 5-isobutyrylxanthone-2-carboxylic acid, and so forth.

EXAMPLE 2

To a solution of 25 grams of xanthone-2-carboxylic acid (prepared as described in Example 1 from 1.3-dicarbomethoxy-4-bromobenzene and phenol) in 200 ml. of triethylene glycol are added 18 g. of potassium hydroxide and 12.1 g. of 95 percent hydrazine. The resultant mixture is heated to reflux (155°C) and maintained thereat for 1 hour. The distillate is removed and the temperature is held at a temperature of about 200°C for 2 hours. The mixture is then cooled to 68°C and 200 ml. of water is added and the resultant solution poured into 110 ml. of water containing 60 ml. of concentrated hydrochloric acid. The resultant mixture is heated to 90°C, cooled to room temperature and filtered to give xanthene-2-carboxylic acid.

Twenty-six Grams of xanthene-2-carboxylic acid is added to 400 ml. of absolute methanol. To the resultant solution are added 18 ml. of concentrated sulfuric acid and the mixture is then heated at reflux for about 2 hours. The mixture is then cooled to 40°C and sufficient water is added to bring the total volume to 1400 ml. The resultant mixture is then filtered to give methyl xanthene-2-carboxylate.

A mixture of 13.0 g. of methyl xanthene-2-carboxylate in 200 ml. of dichloroethane is cooled to −5°C and to the cooled solution are added 4.95 ml. of acetyl chloride and then 17.0 g. of aluminum trichloride. The resultant solution is stirred at room temperature for 1.75 hours. After this time, the solution is poured into a mixture of 300 g. of ice, 700 ml. of water and 20 ml. of concentrated hydrochloric acid. The mixture is then extracted with three 500 ml. portions of methylene chloride. The combined extracts are washed with 10 percent aqueous potassium hydroxide solution and the washed solution evaporated to give methyl 7-acetylxanthene-2-carboxylate.

To a solution of 1.42 g. of methyl 7-acetylxanthene-2-carboxylate in 120 ml. of acetone and 15 ml. of dimethylformamide are added 3.0 g. of magnesium sulfate and 2.5 ml. of 8N chromic acid in 8N sulfuric acid. The resultant mixture is stirred at room temperature for 50 minutes after which time a solution of 4 g. of sodium bisulfite in 20 ml. of water is added. After this time, 250 ml. of water and 25 ml. of sulfuric acid:water (1:1) are added. The mixture is stripped of solvent and filtered. The precipitate is washed with 50 ml. of water to give methyl 7-acetylxanthone-2-carboxylate which is recrystallized from methanol (displacement from methylene chloride solution).

A solution of 2 g. of methyl 7-acetylxanthone-2-carboxylate in 200 ml. of 10 percent aqueous, 10 percent potassium hydroxide in methanol is heated at reflux under a nitrogen atmosphere for 45 minutes. After this time, 20 ml. of water are added and the resultant mixture heated at reflux for 35 minutes. Water (300 ml.) is then added and the resultant mixture acidified and filtered to give 7-acetylxanthone-2-carboxylic acid.

EXAMPLE 3

The procedure of Example 2 is repeated employing, in the procedure of the third paragraph thereof, the acyl chlorides (prepared from the corresponding acids upon treatment with thionyl chloride or oxalyl chloride) listed in Column A below to prepare the corresponding acid products listed in Column B below, through their respective methyl esters.

| Column A | Column B |
| --- | --- |
| propionyl chloride | 7-propionylxanthone-2-carboxylic acid |
| n-butyryl chloride | 7-n-butyrylxanthone-2-carboxylic acid |
| isobutyryl chloride | 7-isobutyrylxanthone-2-carboxylic acid |
| n-pentanoyl chloride | 7-n-pentanoylxanthone-2-carboxylic acid |
| isopentanoyl chloride | 7-isopentanoylxanthone-2-carboxylic acid |
| sec-pentanoyl chloride | 7-sec-pentanoylxanthone-2-carboxylic acid |
| t-pentanoyl chloride | 7-t-pentanoylxanthone-2-carboxylic acid |
| n-hexanoyl chloride | 7-n-hexanoylxanthone-2-carboxylic acid |
| n-heptanoyl chloride | 7-n-heptanoylxanthone-2-carboxylic acid |
| n-octanoyl chloride | 7-n-octanoylxanthone-2-carboxylic acid |
| n-nonanoyl chloride | 7-n-nonanoylxanthone-2-carboxylic acid |
| cyclopropylcarbonyl chloride | 7-cyclopropylcarbonylxanthone-2-carboxylic acid |
| cyclobutylcarbonyl chloride | 7-cyclobutylcarbonylxanthone-2-carboxylic acid |
| cyclopentylcarbonyl chloride | 7-cyclopentylcarbonylxanthone-2-carboxylic acid |
| cyclohexylcarbonyl chloride | 7-cyclohexylcarbonylxanthone-2-carboxylic acid |
| trifluoroacetyl chloride | 7-trifluoroacetylxanthone-2-carboxylic acid |
| difluoroacetyl chloride | 7-difluoroacetylxanthone-2-carboxylic acid |
| trichloroacetyl chloride | 7-trichloroacetylxanthone-2-carboxylic acid |
| dichloroacetyl chloride | 7-dichloroacetylxanthone-2-carboxylic acid |
| benzoyl chloride | 7-benzoylxanthone-2-carboxylic acid |
| p-chlorobenzoyl chloride | 7-(p-chlorobenzoyl)xanthone-2-carboxylic acid |
| p-methylbenzoyl chloride | 7-(p-methylbenzoyl)xanthone-2-carboxylic acid |
| p-methoxybenzoyl chloride | 7-(p-methoxybenzoyl)xanthone-2-carboxylic acid |
| p-thiomethoxybenzoyl chloride | 7-(p-thiomethoxybenzoyl)xanthone-2-carboxylic acid |
| furoyl chloride | 7-furoylxanthone-2-carboxylic acid |
| pyrroyl chloride | 7-pyrroylxanthone-2-carboxylic acid |
| thenoyl chloride | 7-thenoylxanthone-2-carboxylic acid |

| Column A | Column B |
|---|---|
| pyridylcarbonyl chloride | 7-pyridylcarbonylxanthone-2-carboxylic acid |
| imidazolylcarbonyl chloride | 7-imidazolylcarbonylxanthone-2-carboxylic acid |
| oxazolylcarbonyl chloride | 7-oxazolylcarbonylxanthone-2-carboxylic acid |

The foregoing is practiced using the corresponding acyl bromide starting compounds, with similar results.

EXAMPLE 4

A mixture of 1.077 g. of methyl 7-acetylxanthone-2-carboxylate, 200 mg. of sodium borohydride and 150 ml. of tetrahydrofuran is stirred for 2.5 hours at room temperature. The reaction is monitored by tlc. After this period of time, a 5% aqueous acetic acid solution is added to the reaction mixture dropwise to neutrality and the resultant solution evaporated under vacuum and crystallized by the addition of ethanol and hot water. The precipitate is filtered off, washed and dried to give methyl 7-(1-hydroxyethyl)-xanthone-2-carboxylate.

A mixture of 860 mg. of methyl 7-(1-hydroxyethyl)-xanthone-2-carboxylate, 60 ml. of ethanol and 2 ml. of 2N sodium hydroxide is refluxed for 30 minutes. The resultant mixture is cooled, acidified and the precipitate is filtered off, washed, and dried to give 7-(1-hydroxyethyl)-xanthone-2-carboxylic acid.

The foregoing procedures are practiced upon the other 7-acyl methyl esters prepared as described in Example 3 to give the following products, through their respective methyl esters:

7-(1-hydroxy-n-propyl)-xanthone-2-carboxylic acid, 7-(1-hydroxy-n-butyl)-xanthone-2-carboxylic acid,
7-(1-hydroxyisobutyl)-xanthone-2-carboxylic acid,
7-(1-hydroxy-n-pentyl)-xanthone-2-carboxylic acid, 7-(1-hydroxy-isopentyl)-xanthone-2-carboxylic acid, 7-(1-hydroxy-sec-pentyl)-xanthone-2-carboxylic acid,
7-(1-hydroxy-t-pentyl)-xanthone-2-carboxylic acid,
7-(1-hydroxy-n-hexyl)-xanthone-2-carboxylic acid,
7-(1-hydroxy-n-heptyl)-xanthone-2-carboxylic acid, 7-(1-hydroxy-n-octyl)-xanthone-2-carboxylic acid,
7-(1-hydroxy-n-nonyl)-xanthone-2-carboxylic acid,
7-((cyclopropyl)hydroxymethyl)-xanthone-2-carboxylic acid,
7-((cyclobutyl)hydroxymethyl)-xanthone-2-carboxylic acid,
7-((cyclopentyl)hydroxymethyl)-xanthone-2-carboxylic acid,
7-((cyclohexyl)hydroxymethyl)-xanthone-2-carboxylic acid,
7-(2,2,2-trifluoro-1-hydroxyethyl)-xanthone-2-carboxylic acid,
7-(2,2-difluoro-1-hydroxyethyl)-xanthone-2-carboxylic acid,
7-(2,2,2-trichloro-1-hydroxyethyl)-xanthone-2-carboxylic acid,
7-(2,2-dichloro-1-hydroxyethyl)-xanthone-2-carboxylic acid,
7-((phenyl)hydroxymethyl)-xanthone-2-carboxylic acid, 7-((p-chlorophenyl)hydroxymethyl)-xanthone-2-carboxylic acid,
7-((p-methylphenyl)hydroxymethyl)-xanthone-2-carboxylic acid,
7-((p-methoxyphenyl)hydroxymethyl)-xanthone-2-carboxylic acid,
7-((p-thiomethoxyphenyl)hydroxymethyl)-xanthone-2-carboxylic acid,
7-((furyl)hydroxymethyl)-xanthone-2-carboxylic acid,
7-((pyrryl)hydroxymethyl)-xanthone-2-carboxylic acid,
7-((thienyl)hydroxymethyl)-xanthone-2-carboxylic acid,
7-((pyridyl)hydroxymethyl)-xanthone-2-carboxylic acid,
7-((imidazolyl)hydroxymethyl)-xanthone-2-carboxylic acid,
7-((oxazolyl)hydroxymethyl)-xanthone-2-carboxylic acid.

EXAMPLE 5

A solution of 4.1 g. of methyl 7-acetylxanthone-2-carboxylate in 120 ml. of tetrahydrofuran is stirred at 0°C and 6.8 ml. of 3M methylmagnesium bromide solution in ether are added dropwise. After stirring at 0°C for 30 minutes, the reaction mixture is left to warm up to room temperature. A saturated ammonium chloride solution (50 ml.) is then added and the mixture is concentrated in vacuo. Extraction with ethyl acetate followed by evaporation yields methyl 7-(1-hydroxy-1-methylethyl)-xanthone-2-carboxylate. Hydrolysis provides 7-(1-hydroxy-1-methylethyl)-xanthone-2-carboxylic acid.

The foregoing procedure is practiced upon the other 7-acyl methyl esters prepared as described in Example 3 to give the following products, through their respective methyl esters:

7-(1-hydroxy-1-methyl-n-propyl)-xanthone-2-carboxylic acid,
7-(1-hydroxy-1-methyl-n-butyl)-xanthone-2-carboxylic acid,
7-(1-hydroxy-1-methyl-isobutyl)-xanthone-2-carboxylic acid,
7-(1-hydroxy-1-methyl-n-pentyl)-xanthone-2-carboxylic acid,
7-(1-hydroxy-1-methyl-isopentyl)-xanthone-2-carboxylic acid,
7-(1-hydroxy-1-methyl-sec-pentyl)-xanthone-2-carboxylic acid,
7-(1-hydroxy-1-methyl-t-pentyl)-xanthone-2-carboxylic acid,
7-(1-hydroxy-1-methyl-n-hexyl)-xanthone-2-carboxylic acid,
7-(1-hydroxy-1-methyl-n-heptyl)-xanthone-2-carboxylic acid,
7-(1-hydroxy-1-methyl-n-octyl)-xanthone-2-carboxylic acid,
7-(1-hydroxy-1-methyl-n-nonyl)-xanthone-2-carboxylic acid, 7-(1-hydroxy-1-cyclopropylethyl)-xanthone-2-carboxylic acid,
7-(1-hydroxy-1-cyclobutylethyl)-xanthone-2-carboxylic acid,
7-(1-hydroxy-1-cyclopentylethyl)-xanthone-2-carboxylic acid,
7-(1-hydroxy-1-cyclohexylethyl)-xanthone-2-carboxylic acid,
7-(1-hydroxy-1-trifluoromethylethyl)-xanthone-2-carboxylic acid,
7-(1-hydroxy-1-difluoromethylethyl)-xanthone-2-carboxylic acid,
7-(1-hydroxy-1-trichloromethylethyl)-xanthone-2-carboxylic acid,
7-(1-hydroxy-1-dichloromethylethyl)-xanthone-2-carboxylic acid,
7-(1-hydroxy-1-phenylethyl)-xanthone-2-carboxylic acid,
7-(1-hydroxy-1-p-chlorophenylethyl)-xanthone-2-carboxylic acid,
7-(1-hydroxy-1-p-methylphenylethyl)-xanthone-2-carboxylic acid,
7-(1-hydroxy-1-p-methoxyphenylethyl)-xanthone-2-carboxylic acid,
7-(1-hydroxy-1-p-thiomethoxyphenylethyl-xanthone-2-carboxylic acid,
7-(1-hydroxy-1-furylethyl)-xanthone-2-carboxylic acid,
7-(1-hydroxy-1-pyrrylethyl)-xanthone-2-carboxylic acid,
7-(1-hydroxy-1-thienylethyl)-xanthone-2-carboxylic acid,
7-(1-hydroxy-1-pyridylethyl)-xanthone-2-carboxylic acid,
7-(1-hydroxy-1-imidazolylethyl)-xanthone-2-carboxylic acid,
7-(1-hydroxy-1-oxazolylethyl)-xanthone-2-carboxylic acid.

EXAMPLE 6

The procedure of Example 5 is repeated employing, in lieu of methyl magnesium bromide, the reagents listed in Column C below to prepare the products listed in Column D below.

| Column C | Column D |
| --- | --- |
| ethylmagnesium bromide | 7-(1-hydroxy-1-ethylethyl)-xanthone-2-carboxylic acid, 7-(1-hydroxy-1-ethyl-n-propyl)-xanthone-2-carboxylic acid, and so forth, |
| n-propylmagnesium bromide | 7-(1-hydroxy-1-n-propylethyl)-xanthone-2-carboxylic acid, 7-(1-hydroxy-1-n-propyl-n-propyl)-xanthone-2-carboxylic acid, and so forth, |
| isopropylmagnesium bromide | 7-(1-hydroxy-1-isopropylethyl)-xanthone-2-carboxylic acid, 7-(1-hydroxy-1-isopropyl-n-propyl)-xanthone-2-carboxylic acid, and so forth, |
| n-butylmagnesium bromide | 7-(1-hydroxy-1-n-butylethyl)-xanthone-2-carboxylic acid, 7-(1-hydroxy-1-n-butyl-n-propyl)-xanthone-2-carboxylic acid, and so forth, |
| isobutylmagnesium bromide | 7-(1-hydroxy-1-isobutylethyl)-xanthone-2-carboxylic acid, 7-(1-hydroxy-1-isobutyl-n-propyl)-xanthone-2-carboxylic acid, and so forth, |
| sec-butylmagnesium bromide | 7-(1-hydroxy-1-sec-butylethyl)-xanthone-2-carboxylic acid, 7-(1-hydroxy-1-sec-butyl-n-propyl)-xanthone-2-carboxylic acid, and so forth, |
| t-butylmagnesium bromide | 7-(1-hydroxy-1-t-butylethyl)-xanthone-2-carboxylic acid, 7-(1-hydroxy-1-t-butyl-n-propy)-xanthone-2-carboxylic acid, and so forth, |
| n-pentylmagnesium bromide | 7-(1-hydroxy-1-n-pentylethyl)-xanthone-2-carboxylic acid, 7-(1-hydroxy-1-n-pentyl-n-propyl)-xanthone-2-carboxylic acid, and so forth, |
| hexylmagnesium bromide | 7-(1-hydroxy-1-hexylethyl)-xanthone-2-carboxylic acid, 7-(1-hydroxy-1-hexyl-n-propyl)-xanthone-2-carboxylic acid, and so forth, |
| heptylmagnesium bromide | 7-(1-hydroxy-1-heptylethyl)-xanthone-2-carboxylic acid, 7-(1-hydroxy-1-heptyl-n-propyl)-xanthone-2-carboxylic acid, and so forth, |
| octylmagnesium bromide | 7-(1-hydroxy-1-octylethyl)-xanthone-2-carboxylic acid, 7-(1-hydroxy-1-octyl-n-propyl)-xanthone-2-carboxylic acid, and so forth, |
| cyclopropylmagnesium bromide | 7-(1-hydroxy-1-cyclopropylethyl)-xanthone-2-carboxylic acid, 7-(1-hydroxy-1-cyclopropyl-n-propyl)-xanthone-2-carboxylic acid, and so forth, |

| Column C | Column D |
| --- | --- |
| cyclobutylmagnesium bromide | 7-(1-hydroxy-1-cyclobutylethyl)-xanthone-2-carboxylic acid, 7-(1-hydroxy-1-cyclobutyl-n-propyl)-xanthone-2-carboxylic acid, and so forth, |
| cyclopentylmagnesium bromide | 7-(1-hydroxy-1-cyclopentylethyl)-xanthone-2-carboxylic acid, 7-(1-hydroxy-1-cyclopentyl-n-propyl)-xanthone-2-carboxylic acid, and so forth, |
| cyclohexylmagnesium bromide | 7-(1-hydroxy-1-cyclohexylethyl)-xanthone-2-carboxylic acid, 7-(1-hydroxy-1-cyclohexyl-n-propyl)-xanthone-2-carboxylic acid, and so forth. |

EXAMPLE 7

A mixture of methyl xanthene-2-carboxylate (5.1 g.), 7.0 g. of aluminum chloride, 3 g. of chloroacetyl chloride, and 100 ml. of dichloroethane is stirred at room temperature for four hours. After the addition of hydrochloric acid-ice followed by chloroform extraction, the mixture is filtered through alumina ($CH_2Cl_2$), and evaporated to give methyl 7-chloroacetylxanthene-2-carboxylate.

The thus-prepared compound is oxidized according to the procedure of the fourth paragraph of Example 2 to give methyl 7-chloroacetylxanthone-2-carboxylate.

A mixture of 750 mg. of methyl 7-chloroacetylxanthone-2-carboxylate, 200 mg. of sodium borohydride, and 75 ml. of tetrahydrofuran is stirred for one hour at room temperature. Tlc ($CH_2Cl_2$/AcOEt 9:1) indicates the reaction is complete. Excess sodium borohydride is destroyed by the dropwise addition of aqueous acetic acid (5%). The mixture is concentrated in vacuo and extracted with ethyl acetate to give methyl 7-(1-hydroxy-2-chloroethyl)-xanthone-2-carboxylate.

A mixture of 750 mg. of methyl 7-(1-hydroxy-2-chloroethyl)-xanthone-2-carboxylate, 150 mg. of sodium hydride, 75 ml. of dimethylformamide is stirred for three hours at room temperature. Excess sodium hydride is destroyed by adding a few drops of acetic acid. The mixture is then diluted with water, extracted with ethyl acetate and chromatographed on 75 g. of silica ($CH_2Cl_2$/AcOEt; 9:1) to give methyl 7-(1,2-oxidoethyl)-xanthone-2-carboxylate.

A mixture of 118 mg. of methyl 7-(1,2-oxidoethyl)-xanthone-2-carboxylate, 100 mg. of periodic acid, and 15 ml. of tetrahydrofuran is stirred at room temperature for 2 hours. After this time, 15 ml. of methylene chloride is added, the mixture filtered through alumina ($CH_2Cl_2$), and evaporated. The residue is crystallized from methylene chloride:methanol to give methyl 7-formylxanthone-2-carboxylate.

A mixture of 1.2 g. of methyl 7-formylxanthone-2-carboxylate, 10 ml. of 2N sodium hydroxide, and 90 ml. of ethanol is refluxed for 60 minutes. Then, it is acidified, cooled, and suction filtered to give 7-formylxanthone-2-carboxylic acid.

Reduction thereof as described in the first paragraph of Example 4 gives 7-hydroxymethylxanthone-2-carboxylic acid.

Employing methyl 5-chloroacetylxanthene-2-carboxylate, prepared as described above, in the above procedure, affords 5-formylxanthone-2-carboxylic acid which can be reduced to 5-hydroxymethylxanthone-2-carboxylic acid.

EXAMPLE 8

5-Ethylxanthone-2-carboxylic acid is prepared from 1,3-dicarbomethoxy-4-bromobenzene and o-ethylphenol in accordance with the procedures set forth in Example 1 above.

A mixture of 4 g. of the thus-obtained 5-ethylxanthone-2-carboxylic acid, 10 g. of methyl iodide, and 10 g. of potassium carbonate in 50 ml. of dimethylformamide is stirred at room temperature for a period of 16 hours. After this period of time, the reaction mixture is poured into dilute hydrochloric acid-ice and the resultant mixture extracted with ethyl acetate.

The extracts are filtered through alumina to give methyl 5-ethylxanthone-2-carboxylate which can be recrystallized from methanol.

A suspension of 2.5 g. of methyl 5-ethylxanthone-2-carboxylate and 2.5 g. of chromic oxide in 190 ml. of acetic acid and 10 ml. of acetic anhydride is stirred at room temperature for a period of 6 hours. After monitoring the reaction by tlc indicates the absence of starting material, 10 ml. of isopropanol are added and the resultant mixture warmed on the steam bath. Water (200 ml.) is then added portionwise to the resultant mixture is cooled to room temperature. The precipitate is filtered off, washed, and dried to obtain methyl 5-acetylxanthone-2-carboxylate.

A mixture of 1.09 g. of methyl 5-acetylxanthone-2-carboxylate, 70 ml. of isopropanol, 5 ml. of saturated sodium carbonate solution, and 25 ml. of water is refluxed for two hours. The resultant mixture is then acidified, cooled and the crystals filtered off, washed, and dried to give 5-acetylxanthone-2-carboxylic acid.

The foregoing procedures can be followed with other 5-substituted methyl compounds (prepared according to the procedures of Example 1) to give the corresponding 5-acyl compounds, to wit:

5-propionylxanthone-2-carboxylic acid;
5-n-butyrylxanthone-2-carboxylic acid;
5-isobutyrylxanthone-2-carboxylic acid;
5-n-pentanoylxanthone-2-carboxylic acid;
5-isopentanoylxanthone-2-carboxylic acid;
5-sec-pentanoylxanthone-2-carboxylic acid;
5-t-pentanoylxanthone-2-carboxylic acid;
5-n-hexanoylxanthone-2-carboxylic acid;
5-n-heptanoylxanthone-2-carboxylic acid;
5-n-octanoylxanthone-2-carboxylic acid;
5-n-nonanoylxanthone-2-carboxylic acid;

5-cyclopropylcarbonylxanthone-2-carboxylic acid;
5-cyclobutylcarbonylxanthone-2-carboxylic acid;
5-cyclopentylcarbonylxanthone-2-carboxylic acid;
5-cyclohexylcarbonylxanthone-2-carboxylic acid;
5-trifluoroacetylxanthone-2-carboxylic acid;
5-difluoroacetylxanthone-2-carboxylic acid;
5-trichloroacetylxanthone-2-carboxylic acid;
5-dichloroacetylxanthone-2-carboxylic acid;
5-benzoylxanthone-2-carboxylic acid;
5-(p-chlorobenzoyl)-xanthone-2-carboxylic acid;
5-(p-methylbenzoyl)-xanthone-2-carboxylic acid;
5-(p-methoxybenzoyl)-xanthone-2-carboxylic acid;
5-(p-thiomethoxybenzoyl)-xanthone-2-carboxylic acid;
5-furoylxanthone-2-carboxylic acid;
5-pyrroylxanthone-2-carboxylic acid;
5-thenoylxanthone-2-carboxylic acid;
5-pyridylcarbonylxanthone-2-carboxylic acid;
5-imidazolylcarbonylxanthone-2-carboxylic acid;
5-oxazolylcarbonylxanthone-2-carboxylic acid.

EXAMPLE 9

Methyl 5-acetylxanthone-2-carboxylate is treated in accordance with the procedure of the first paragraph of Example 4, to give methyl 5-(1-hydroxyethyl)-xanthone-2-carboxylate which is hydrolyzed in accordance with the second paragraph thereof to give 5-(1-hydroxyethyl)-xanthone-2-carboxylic acid.

The foregoing procedures can be followed with other 5-acyl methyl esters prepared as described in Example 8 to give the corresponding 5-(1-hydroxyalkyl) compounds through their methyl esters, to wit:

5-(1-hydroxy-n-propyl)-xanthone-2-carboxylic acid;

5-(1-hydroxy-n-butyl)-xanthone-2-carboxylic acid;
5-(1-hydroxyisobutyl)-xanthone-2-carboxylic acid;
5-(1-hydroxy-n-pentyl)-xanthone-2-carboxylic acid;

5-(1-hydroxyisopentyl)-xanthone-2-carboxylic acid;

5-(1-hydroxy-sec-pentyl-xanthone-2-carboxylic acid;

5-(1-hydroxy-t-pentyl)-xanthone-2-carboxylic acid;
5-(1-hydroxy-n-hexyl)-xanthone-2-carboxylic acid;
5-hydroxy-n-heptyl)-xanthone-2-carboxylic acid;
5-(1-hydroxy-n-octyl)-xanthone-2-carboxylic acid;
5-(1-hydroxy-n-nonyl)-xanthone-2-carboxylic acid;
5-((cyclopropyl)hydroxymethyl)-xanthone-2-carboxylic acid;
5-((cyclobutyl)hydroxymethyl)-xanthone-2-carboxylic acid;
5-((cyclopentyl)hydroxymethyl)-xanthone-2-carboxylic acid;
5-((cyclohexyl)hydroxymethyl)-xanthone-2-carboxylic acid;
5-(2,2,2-trifluoro-1-hydroxyethyl)-xanthone-2-carboxylic acid;
5-(2,2-difluoro-1-hydroxyethyl)-xanthone-2-carboxylic acid;
5-(2,2,2-trichloro-1-hydroxyethyl)-xanthone-2-carboxylic acid;
5-(2,2-dichloro-1-hydroxyethyl)-xanthone-2-carboxylic acid;
5-((phenyl)hydroxymethyl)-xanthone-2-carboxylic acid 5-((p-chlorophenyl)hydroxymethyl)-xanthone-2-carboxylic acid;
5-((p-methylphenyl)hydroxymethyl)-xanthone-2-carboxylic acid;
5-((p-methoxyphenyl)hydroxymethyl)-xanthone-2-carboxylic acid;
5-((p-thiomethoxyphenyl)hydroxymethyl)-xanthone-2-carboxylic acid;
5-((furyl)hydroxymethyl)-xanthone-2-carboxylic acid;
5-((pyrryl)hydroxymethyl)-xanthone-2-carboxylic acid;
5-((thienyl)hydroxymethyl)-xanthone-2-carboxylic acid;
5-((pyridyl)hydroxymethyl)-xanthone-2-carboxylic acid;
5-((imidazolyl)hydroxymethyl)-xanthone-2-carboxylic acid;
5-((oxazolyl)hydroxymethyl)-xanthone-2-carboxylic acid.

EXAMPLE 10

Methyl 5-acetylxanthone-2-carboxylic acid is treated in accordance with the procedure of the first paragraph of Example 5 to give methyl 5(1-hydroxy-1-methylethyl)-xanthone-2-carboxylate which is hydrolyzed in accordance with the second paragraph thereof to give 5-(1-hydroxy-1-methylethyl)-xanthone-2-carboxylic acid.

The foregoing procedure is practiced upon the other 5-acyl methyl esters prepared as described in Example 8 to give the following products, through their respective methyl esters:

5-(1-hydroxy-1-methyl-n-propyl)-xanthone-2-carboxylic acid;
5-(1-hydroxy-1-methyl-n-butyl)-xanthone-2-carboxylic acid;
5-(1-hydroxy-1-methyl-isobutyl)-xanthone-2-carboxylic acid;
5-(1-hydroxy-1-methyl-n-pentyl)-xanthone-2-carboxylic acid;
5-(1-hydroxy-1-methyl-isopentyl)-xanthone-2-carboxylic acid;
5-(1-hydroxy-1-methylsec-pentyl)-xanthone-2-carboxylic acid;
5-(1-hydroxy-1-methy-t-pentyl)-xanthone-2-carboxylic acid;
5-(1-hydroxy-1-methyl-n-hexyl)-xanthone-2-carboxylic acid;
5-(1-hydroxy-1-methyl-n-heptyl)-xanthone-2-carboxylic acid;
5-(1-hydroxy-1-methyl-n-octyl)-xanthone-2-carboxylic acid;
5-(1-hydroxy-1-methyl-n-nonyl)-xanthone-2-carboxylic acid;
5-(1-hydroxy-1-cyclopropylethyl)-xanthone-2-carboxylic acid;
5-(1-hydroxy-1-cyclobutylethyl)-xanthone-2-carboxylic acid;
5-(1-hydroxy-1-cyclopentylethyl)-xanthone-2-carboxylic acid;
5-(1hydroxy-1-cyclohexylethyl)-xanthone-2-carboxylic acid;
5-(1-hydroxy-1-trifluoromethylethyl)-xanthone-2-carboxylic acid;
5-(1-hydroxy-1-difluoromethylethyl)-xanthone-2-carboxylic acid;

5-(1-hydroxy-1-trichloromethylethyl)-xanthone-2-carboxylic acid;
5-(1-hydroxy-1-dichloromethylethyl)-xanthone-2-carboxylic acid;
5-(1-hydroxy-1-phenylethyl)-xanthone-2-carboxylic acid;
5-(1-hydroxy-1-p-chlorophynylethyl)-xanthone-2-carboxylic acid;
5-(1-hydroxy-1-p-methylphenylethyl)-xanthone-2-carboxylic acid;
5-(1-hydroxy-1-p-methoxyphenylethyl)-xanthone-2-carboxylic acid;
5-(1-hydroxy-1-p-thiomethoxyphenylethyl)-xanthone-2-carboxylic acid;
5-(1-hydroxy-1-furylethyl)-xanthone-2-carboxylic acid;
5-(1-hydroxy-1-pyrrylethyl)-xanthone-2-carboxylic acid;
5-(1-hydroxy-1-thienylethyl)-xanthone-2-carboxylic acid;
5-(1-hydroxy-1-pyridylethyl)-xanthone-2-carboxylic acid;
5-(1-hydroxy-1-imidazolylethyl)-xanthone-2-carboxylic acid;
5-(1-hydroxy-1-oxazolylethyl)-xanthone-2-carboxylic acid;

EXAMPLE 11

The procedure of Example 10 is repeated employing, in lieu of methyl magnesium bromide, the reagents listed in Column C below to prepare the products listed in Column D below.

| Column C | Column D |
|---|---|
| ethylmagnesium bromide | 5-(1-hydroxy-1-ethylethyl)-xanthone 2-carboxylic acid, 5-(1-hydroxy-1-ethyl-n-propyl)-xanthone-2-carboxylic acid, and so forth, |
| n-propylmagnesium bromide | 5-(1-hydroxy-1-n-npropylethyl)-xanthone-2-carboxylic acid, 5-(1-hydroxy-1-n-propyl-n-propyl)-xanthone-2-carboxylic acid, and so forth, |
| isopropylmagnesium bromide | 5-(1-hydroxy-1-isopropylethyl)-xanthone-2-carboxylic acid, 5-(1-hydroxy-1-isopropyl-n-propyl)-xanthone-2-carboxylic acid, and so forth, |
| n-butylmagnesium bromide | 5-(1-hydroxy-1-n-butylethyl)-xanthone-2-carboxylic acid, 5-(1-hydroxy-1-n-butyl-n-propyl)-xanthone-2-carboxylic acid, and so forth, |
| isobutylmagnesium bromide | 5-(1-hydroxy-1-isobutylethyl)-xanthone-2-carboxylic acid, 5-(1-hydroxy-1-isobutyl-n-propyl)-xanthone-2-carboxylic acid, and so forth, |
| sec-butylmagnesium bromide | 5-(1-hydroxy-1-sec-butylethyl-xanthone-2-carboxylic acid, 5-(1-hydroxy-1-sec-butyl-n-propyl)-xanthone-2-carboxylic acid, and so forth, |
| t-butylmagnesium bromide | 5-(1-hydroxy-1-t-butylethyl)-xanthone-2-carboxylic acid, 5-(1-hydroxy-1-t-butyl-n-propyl)-xanthone-2-carboxylic acid, and so forth, |
| n-pentylmagnesium bromide | 5-(1-hydroxy-1-n-pentylethyl)-xanthone-2-carboxylic acid, 5-(1-hydroxy-1-n-pentyl-n-propyl)-xanthone-2-carboxylic acid, and so forth, |
| hexylmagnesium bromide | 5-(1-hydroxy-1-hexylethyl)-xanthone-2-carboxylic acid, 5-(1-hydroxy-1-hexyl-n-propyl)-xanthone-2-carboxylic acid, and so forth, |
| heptylmagnesium bromide | 5-(1-hydroxy-1-heptylethyl)-xanthone-2-carboxylic acid, 5-(1-hydroxy-1-heptyl-n-propyl)-xanthone-2-carboxylic acid, and so forth, |
| octylmagnesium bromide | 5-(1-hydroxy-1-octylethyl)-xanthone-2-carboxylic acid, 5-(1-hydroxy-1-octyl-n-propyl)-xanthone-2-carboxylic acid, and so forth, |
| cyclopropylmagnesium bromide | 5-(1-hydroxy-1-cyclopropylethyl)-xanthone-2-carboxylic acid, 5-(1-hydroxy-1-cyclopropyl-n-propyl)-xanthone-2-carboxylic acid, and so forth, |
| cyclobutylmagnesium bromide | 5-(1-hydroxy-1-cylobutylethyl)-xanthone-2-carboxylic acid, 5-(1-hydroxy-1-cyclobutyl-n-propyl)-xanthone-2-carboxylic acid, and so forth, |

| Column C | Column D |
|---|---|
| cyclopentylmagnesium bromide | 5-(1-hydroxy-1-cyclopentylethyl)-xanthone-2-carboxylic acid, 5-(1-hydroxy-1-cyclopentyl-n-propyl)-xanthone-2-carboxylic acid, and so forth, |
| cyclohexylmagnesium bromide | 5-(1-hydroxy-1-cyclohexylethyl)-xanthone-2-carboxylic acid 5-(1-hydroxy-1-cyclohexyl-n-propyl)-xanthone-2-carboxylic acid, and so forth. |

EXAMPLE 12

Methyl 5-methylxanthone-2-carboxylate is prepared by the procedure of Example 1 from o-methylphenol, followed by the preparation of the methyl ester of the thus-produced acid.

To a solution of 2.4 g. of methyl 5-methylxanthone-2-carboxylate in 30 ml. acetic acid and 30 ml. acetic anhydride are added 4.8 ml. concentrate sulfuric acid at 0°C. After the addition of 5.6 g. of chromic acid, the mixture is stirred for five hours. The crude diacetoxymethyl intermediate is isolated by diluting the reaction mixture with water and filtering off the precipitate. The formyl derivative is obtained by refluxing the diacetoxymethyl compound thus obtained with 10 ml. 2N sulfuric acid in 90 ml. methanol for 30 minutes, cooling, diluting with 60 ml. water and filtering off the precipitate to give 5-formylxanthone-2-carboxylic acid. This compound can be reduced as described above to 5-hydroxymethylxanthone-2-carboxylic acid.

7-Formylxanthone-2-carboxylic acid is prepared by the above procedure, preferably by using 30 ml. of 2N sulfuric acid in 70 ml. of ethanol for 2 hour treatment of the diacetate.

EXAMPLE 13

A mixture of 51.5 g. of 1,3-dimethyl-4-iodobenzene (4-iodo-m-xylene), 40 g. of o-formylphenol, 16 g. of cuprous oxide in 300 ml. of dimethylacetamide is heated to the boiling point and maintained under reflux (190°C) for 144 hours with stirring and under a nitrogen atmosphere. The reaction mixture is then poured into ice water and extracted with ether and the extracts are filtered through 500 g. of alumina in hexane to give 1,3-dimethyl-4-o-formylphenyloxy)-benzene.

A mixture of 41 g. of 1,3-dimethyl-4-(o-formylphenyloxy)- benzene, 300 g. of potassium permanganate, 500 ml. of t-butanol, and 750 ml. of water is heated to the boiling point and maintained thereat for a period of three hours. After distilling off the t-butanol, the reaction mixture is filtered, the clear filtrate acidified and the precipitate of 1,3-dicarboxy-4-(o-formylphenyloxy)-benzene is isolated by suction filtration and washed with water.

The 1,3-dicarboxy-4-(o-formylphenyloxy)-benzene thus prepared is then cyclized as described in Examples 1 or 14 to give 5-formylxanthone-2-carboxylic acid.

In like manner, the other C-5 and -7-substituted xanthone-2-carboxylic acid compounds hereof are prepared. These compounds can then be treated as described in Examples 4 to 6 and 8 to 11 to prepare the corresponding C-5 and -7-substituted compounds.

EXAMPLE 14

A mixture of 2.84 ml. of o-ethylphenol, 5.0 g. of 1,3-dicarbomethoxy-4-bromobenzene and 1.31 g. of cuprous oxide in 100 ml. of dimethylacetamide is stirred under reflux overnight. The resultant mixture is then poured on ice and extracted with ether. The ether extracts are washed with water and 2N aqueous sodium hydroxide. The washed extracts are dried and evaporated to give 1,3-dicarbomethoxy-4-(o-ethylphenyloxy)-benzene which can be purified by chromatography through alumina with gradient elution with benzene:-hexane (50:50 – 60:40).

A mixture of 24 g. of 1,2-dicarbomethoxy-4-(o-ethylphenyloxyl)-benzene, 20 g. of potassium hydroxide, 300 ml. of ethanol and 20 ml. of water are heated on a steam bath for about one-half hour. After this time, the reaction mixture is acidified with dilute hydrochloric acid and the ethanol evaporated. The resultant mixture is then extracted with ethyl acetate and the extracts are dried and evaporated to give 1,3-dicarboxy-4-(o-ethylphenyloxy)-benzene which can be crystallized from methanol:ethyl acetate.

A mixture of 1.94 g of 1,3-dicarboxy-4-(o-ethylphenyloxy)-benzene, 40 ml. of sulfolane and 30 ml. of polyphosphoric acid is stirred at 160°C for 30 minutes. The resultant mixture is then diluted with water and the diluted mixture filtered. The precipitate is washed neutral, and then dissolved and heated in ethanol containing charcoal. The resultant mixture is then filtered, and the ethanol is partially evaporated. Water is added until crystallization starts. Filtration gives the solid product 5-ethylxanthone-2-carboxylic acid which can be recrystallized from ethanol.

The foregoing product is useful as described in Example 8 et seq.

In like manner, the foregoing reactions can be conducted using an alternate 1,3-dicarboalkoxy-4-halobenzene starting material such as 1,3-dicarboxy-4-bromobenzene, 1,3-dicarboethoxy-4-iodobenzene, and so forth, with similar results.

Upon substituting the other phenol starting compounds in the process of the preceding example, there are obtained the corresponding C-5 and C-7 substituted xanthone-2-carboxylic acids.

EXAMPLE 15

To a solution of 6 g. of methyl 7-acetylxanthene-2-carboxylate in 500 ml. of absolute methanol are added 1.1 g. of sodium borohydride in 50 ml. of water at a temperature of from 25° to 30°C with stirring, over a period of about 30 minutes. After 15 minutes under these conditions, 400 ml. of water and 20 ml. of acetic acid are added and the resultant mixture is stripped of solvent. The resultant mixture is extracted with methylene chloride and washed with bicarbonate and water. The washed extracts are concentrated to give methyl 7-(1-hydroxy-ethyl)-xanthene-2-carboxylate.

A solution of 5.5 g. of methyl 7-(1-hydroxyethyl)-xanthene-2-carboxylate in 100 ml. of pyridine is cooled in an ice bath. To the cooled solution are added 2.91 ml. of acetyl chloride and the resultant mixture is stirred in an ice bath for one-half hour and then at room temperature for 1 hour. After this time, the reaction mixture is poured into dilute hydrochloric acid-ice and the precipitate is filtered off and washed to give methyl 7-(1-acetoxyethyl)-xanthene-2-carboxylate.

To a solution of 3 g. of methyl 7-(1-acetoxyethyl)-xanthene-2-carboxylate in 80 ml. of acetone are added 12 ml. of 8N chromic acid in 8N sulfuric acid. The resultant mixture is stirred at room temperature for 1¼ hours. Excess chromic oxide is decomposed with aqueous sodium bisulfite and to the resultant mixture are added 500 ml. of water. The resultant mixture is stripped of solvent and extracted with methylene chloride. The methylene chloride extracts are washed with 10 percent aqueous sodium bicarbonate solution and the washed extracts are concentrated in vacuum to give methyl 7-(1-acetoxyethyl)-xanthone-2-carboxylate.

A solution of 2.70 g. of methyl 7-(1-acetoxyethyl)-xanthone-2-carboxylate in 300 ml. of a 10% potassium hydroxide 10 percent aqueous methanol solution is heated under reflux under a nitrogen atmosphere for a period of one hour. After this time, 40 ml. of concentrated hydrochloric acid in 70 ml. of water are added. Thereafter, 100 ml. of water are added and the resultant solution is stripped of solvent in vacuum and filtered to give 7-(1-hydroxyethyl)-xanthone-2-carboxylic acid.

In like manner, by subjecting the other 7-acyl or 5-acyl xanthone-2-carboxylic compounds as described in Examples 1 to 3 and 8 above to the procedure of the present example, the corresponding (1-hydroxyalkyl)-xanthone-2-carboxylic acid compounds are prepared.

EXAMPLE 16

A mixture of 2 g. of 7-(1-hydroxyethyl)-xanthone-2-carboxylic acid in 8 ml. of pyridine and 4 ml. of acetyl chloride is heated at steam bath temperatures for one hour. The mixture is then poured into HCl/ice water and the solid which forms is collectd by filtration, washed with water and dried to yield 7-(1-acetoxyethyl)-xanthone-2-carboxylic acid.

In a similar manner, 5-(1-acetoxyethyl)-xanthone-2-carboxylic acid is prepared.

Upon substitution of the appropriate acyl chloride in the above procedure and, in addition, employing as starting compounds the products listed in Examples 4 and 9, the following compounds are prepared:

7-(1-propionyloxyethyl)-xanthone-2-carboxylic acid, 5-(1-propionyloxyethyl)-xanthone-2-carboxylic acid, 7-(1-butyryloxyethyl)-xanthone-2-carboxylic acid,
5-(1-butyryloxyethyl)-xanthone-2-carboxylic acid,
7-(1-acetoxy-n-propyl)-xanthone-2-carboxylic acid,
5-(1-acetoxy-n-propyl)-xanthone-2-carboxylic acid, and so forth,
7-(1-acetoxy-n-butyl)-xanthone-2-carboxylic acid,
5-(1-acetoxy-n-butyl)-xanthone-2-carboxylic acid, and so forth,
7-(1-acetoxyisobutyl)-xanthone-2-carboxylic acid,
5-(1-acetoxyisobutyl)-xanthone-2-carboxylic acid, and so forth,
7-((cyclopropyl)acetoxymethyl)-xanthone-2-carboxylic acid,
5-((cyclopropyl)acetoxymethyl)-xanthone-2-carboxylic acid, and so forth,
7-((phenyl)acetoxymethyl)-xanthone-2-carboxylic acid,
5-((phenyl)acetoxymethyl)-xanthone-2-carboxylic acid, and so forth.

EXAMPLE 17

A mixture of 2 g. of 7-(1-hydroxy-1-methylethyl)-xanthone-2-carboxylic acid, 15 ml. of tetrahydrofuran, 5 ml. of dimethylaniline, and 5 ml. of acetyl chloride is refluxed for six hours. The mixture is then concentrated in vacuo to remove a portion of the tetrahydrofuran. Dilute HCl is added, the mixture is filtered, washed and dried to give 7-(1-acetoxy-1-methylethyl)-xanthone-2-carboxylic acid.

In a similar manner, 5-(1-acetoxy-1-methylethyl)-xanthone-2-carboxylic acid is prepared.

Upon substitution of the appropriate acyl chloride in the above procedure and, in addition, employing as starting compounds the products listed in Examples 5, 6, 10 and 11, the following compounds are prepared:

7-(1-acetoxy-1-methyl-n-propyl)-xanthone-2-carboxylic acid,
7-(1-acetoxy-1-methyl-isobutyl)-xanthone-2-carboxylic acid,
7-(1-propionyloxy-1-methyl-n-propyl)-xanthone-2-carboxylic acid,
7-(1-propionyloxy-1-methyl-isobutyl)-xanthone-2-carboxylic acid,
7-(1-acetoxy-1-ethylethyl)xanthone-2-carboxylic acid,
7-(1-acetoxy-1-isopropylethyl)-xanthone-2-carboxylic acid,
5-(1-acetoxy-1-methyl-n-propyl)-xanthone-2-carboxylic acid,
5-(1-acetoxy-1-methyl-isobutyl)-xanthone-2-carboxylic acid,
5-(1-propionyloxy-1-methyl-n-propyl)-xanthone-2-carboxylic acid,
5-(1-propionyloxy-1-methyl-isobutyl)-xanthone-2-carboxylic acid,
5-(1-acetoxy-1-ethylethyl)-xanthone-2-carboxylic acid, and
5-(1-acetoxy-1-isopropylethyl)-xanthone-2-carboxylic acid.

EXAMPLE 18

To a mixture of 2.5 g. of methyl 7-(1-hydroxyethyl)-xanthone-2-carboxylate and 500 mg. of sodium hydride in 45 ml. of dimethylformamide is added 2 ml. of methyl iodide and the mixture is stirred at room temperature for 16 hours. The mixture is then poured into dilute HCl/ice water, filtered and dried to give methyl 7-(1-methoxyethyl)-xanthone-2-carboxylate.

The resultant product is hydrolyzed according to the procedure of Paragraph 2 of Example 1 to give 7-(1-methoxyethyl)-xanthone-2-carboxylic acid.

In a similar manner, 5-(1-methoxyethyl)-xanthone-2-carboxylic acid is prepared.

Upon substitution of the appropriate alkyl or cycloalkyl iodide or bromide and, in addition, employing as starting compounds the products listed in Examples 4 and 9, the following compounds are prepared, through their respective esters:

7-(1-ethoxyethyl)-xanthone-2-carboxylic acid,
5-(1-ethoxyethyl)-xanthone-2-carboxylic acid,
7-(1-n-propoxyethyl)-xanthone-2-carboxylic acid,
5-(1-n-propoxyethyl)-xanthone-2 -carboxylic acid,
7-(1-isopropoxyethyl)-xanthone-2-carboxylic acid,
5-(1-isopropoxyethyl)-xanthone-2-carboxylic acid,
7-(1-cyclopentyloxyethyl)-xanthone-2-carboxylic acid,
5-(1-cyclopentyloxyethyl)-xanthone-2-carboxylic acid,
7-(1-methoxy-n-propyl)-xanthone-2-carboxylic acid,
5-(1-methoxy-n-propyl)-xanthone-2-carboxylic acid, and so forth,
7-(1-methoxy-n-butyl)-xanthone-2-carboxylic acid,
5-(1-methoxy-n-butyl)-xanthone-2-carboxylic acid, and so forth,
7-(1-methoxyisobutyl)-xanthone-2-carboxylic acid,
5-(1-methoxyisobutyl)-xanthone-2-carboxylic acid, and so forth,
7-((cyclopropyl)methoxymethyl)-xanthone-2-carboxylic acid,
5-((cyclopropyl)methoxymethyl)-xanthone-2-carboxylic acid, and so forth,
7-((phenyl)methoxymethyl)-xanthone-2-carboxylic acid,
5-((phenyl)methoxymethyl)-xanthone-2-carboxylic acid, and
7-(1-methoxy-1-methylethyl)-xanthone-2-carboxylic acid,
5-(1-methoxy-1-methylethyl)-xanthone-2-carboxylic acid, and so forth.

EXAMPLE 19

A solution of 4.1 g. of methyl 7-acetylxanthone-2-carboxylate in 120 ml. of tetrahydrofuran is stirred at 0°C and 6.8 ml. of 3M methylmagnesium bromide solution in ether are added dropwise. After stirring at 0°C for 30 minutes, 2 ml. of methyl iodide and 30 ml. of hexamethylphosphoramide are added and the mixture is stirred at room temperature for five hours. A saturated ammonium chloride solution (50 ml.) is then added and the mixture is concentrated in vacuo. Extraction with ethyl acetate followed by evaporation yields methyl 7-(1-methoxy-1-methylethyl)-xanthone-2-carboxylate. Hydrolysis provides 7-(1-methoxy-1-methylethyl)-xanthone-2-carboxylic acid.

Likewise, 5-(1-methoxy-1-methylethyl)-xanthone-2-carboxylic acid is prepared.

Upon substituting the appropriate alkyl or cycloalkyl bromide and, in addition, using the other starting materials listed in Examples 3 and 8, the following compounds are prepared:

7-(1-ethoxy-1-methylethyl)-xanthone-2-carboxylic acid,
5-(1-ethoxy-1-methylethyl)-xanthone-2-carboxylic acid,
7-(1-propoxy-1-methylethyl)-xanthone-2-carboxylic acid,
5-(1-propoxy-1-methylethyl)-xanthone-2-carboxylic acid,
7-(1-cyclopentyloxy-1-methylethyl)-xanthone-2-carboxylic acid,
5-(1-cyclopentyloxy-1-methylethyl)-xanthone-2-carboxylic acid,
7-(1-methoxy-1-methyl-n-propyl)-xanthone-2-carboxylic acid,
5-(1-methoxy-1-methyl-n-propyl)-xanthone-2-carboxylic acid, and so forth,
7-(1-methoxy-1-methyl-isobutyl)-xanthone-2-carboxylic acid,
5-(1-methoxy-1-methyl-isobutyl)-xanthone-2-carboxylic acid, and so forth,
7-(1-methoxy-1-cyclopentylethyl)-xanthone-2-carboxylic acid,
5-(1-methoxy-1-cyclopentylethyl)-xanthone-2-carboxylic acid, and so forth,
7-(1-methoxy-1-phenylethyl)-xanthone-2-carboxylic acid,
5-(1-methoxy-1-phenylethyl)-xanthone-2-carboxylic acid, and so forth.

EXAMPLE 20

A mixture of 1.6 g. of methyl 7-(1-hydroxyethyl)-xanthone-2-carboxylate, 50 ml. of methylene chloride, 50 ml. of isobutene and 2 ml. of $BF_3/H_3PO_4$ catalyst are shaken in a pressure bottle for four days at room temperature. The reaction mixture is diluted with methylene chloride, washed with bicarbonate solution, then water, dried and evaporated and crystallized from methanol to give methyl 7-(1-t-butoxyethyl)-xanthone-2-carboxylate.

Hydrolysis provides 7-(1-t-butoxyethyl)-xanthone-2-carboxylic acid.

Likewise, 5-(1-t-butoxyethyl)-xanthone-2-carboxylic acid is prepared.

Likewise, the following products are prepared from the respective starting compounds:

7-(1-t-butoxy-n-propyl)-xanthone-2-carboxylic acid,
5-(1-t-butoxy-n-propyl)-xanthone-2-carboxylic acid,
7-(1-t-butoxy-isobutyl)-xanthone-2-carboxylic acid,
5-(1-t-butoxy-isobutyl)-xanthone-2-carboxylic acid,
7-((cyclopropyl)-t-butoxymethyl)-xanthone-2-carboxylic acid,
5-((cyclopropyl)-t-butoxymethyl)-xanthone-2-carboxylic acid,
7-((phenyl)-t-butoxymethyl)-xanthone-2-carboxylic acid,
5-((phenyl)-t-butoxymethyl)-xanthone-2-carboxylic acid,
7-(1-t-butoxy-1-methylethyl)-xanthone-2-carboxylic acid,
5-(1-t-butoxy-1-methylethyl)-xanthone-2-carboxylic acid, and so forth.

EXAMPLE 21

Ten milliliters of dihydropyran are added to a solution of 1 g. of methyl 7-(1-hydroxyethyl)-xanthone-2-carboxylate in 50 ml. of benzene. About 1 ml. is removed by distillation to remove moisture and 0.4 g. of p-toluenesulfonic acid is added to the cooled solution. This mixture is allowed to stand at room temperature for 4 days, and is then washed with aqueous sodium carbonate solution and water, dried and evaporated. The residue is crystallized from chloroform/methanol/pyridine to yield methyl 7-(1-tetrahydropyran-2'-yloxyethyl)-xanthone-2-carboxylate.

Methyl 7-(1-tetrahydropyran-2'-yloxy-1-methylethyl)-xanthone-2-carboxylate is prepared from methyl 7-(1-hydroxy-1-methylethyl)-xanthone-2-carboxylate by conducting the above reaction at reflux for 2 hours.

Hydrolysis provides 7-(1-tetrahydropyran-2'-yloxyethyl)-xanthone-2-carboxylic acid and 7-(1- tetrahydropyran-2'-yloxy-1-methylethyl)-xanthone-2-carboxylic acid, respectively.

In like manner, 5-(1-tetrahydropyran-2'-yloxyethyl)-xanthone-2-carboxylic acid is prepared. By use of dihydrofuran in the above procedure, 7-(1-tetrahydrofuran-2'-yloxyethyl)-xanthone-2-carboxylic acid, 7-(1-tetrahydrofuran-2'-yloxy-1-methylethyl)-xanthone-2-carboxylic acid, 5-(1-tetrahydrofuran-2'-yloxyethyl)-xanthone-2-carboxylic acid, 5-(1-tetrahydrofuran-2'-yloxy-1-methylethyl)-xanthone-2-carboxylic acid are prepared.

In like manner, the following compounds are prepared:
7-(1-tetrahydropyran-2'-yloxy-n-propyl)-xanthone-2-carboxylic acid,
7-(1-tetrahydropyran-2'-yloxy-isobutyl)-xanthone-2-carboxylic acid,
7-(1-tetrahydropyran-2'-yloxy-1-ethylethyl)-xanthone-2-carboxylic acid, and the tetrahydrofuran-2'-yloxy and C-5 substituted compounds corresponding thereto.

3.5 grams of methyl 7-(1-hydroxyethyl)-xanthone-2-carboxylate in 150 ml. of benzene and 500 mg. of p-toluene-sulfonic acid (dried by azeotropic distillation from benzene) are mixed together and the reaction mixture is treated with 4-methoxy-5,6-dihydro-2H-pyran, 1 ml. at a time until reaction is complete (followed by tlc). The reaction is quenched by addition of 1/2 ml. of triethylamine, washed with water, and crystallized with care from methanol containing pyridine to give methyl 7-(1-4'-methoxytetrahydropyran-4'-yloxyethyl))-xanthone-2-carboxylate.

Methyl 7-(1-4'-methoxytetrahydropyran-4'-yloxy-1-methyl-ethyl)-xanthone-2-carboxylate is prepared from methyl 7-(1-hydroxy-1-methylethyl)-xanthone-2-carboxylate by conducting the above reaction at reflux for 2 hours.

Hydrolysis provides 7-(1-4'-methoxytetrahydropyran-4'-yloxyethyl)-xanthone-2-carboxylic acid and 7-(1-4'-methoxy-tetrahydropyran-4'-yloxy-1-methylethyl)-xanthone-2-carboxylic acid respectively.

A solution of 1.4 g. of aluminum chloride in 25 ml. of tetrahydrofuran is treated with a solution of 0.4 g of lithium aluminum hydride in 100 ml. of ether. Methyl 7-(1-4'-methoxy-tetrahydropyran-4'-yloxyethyl)-xanthone-2-carboxylate (500 mg.) is extracted into the solution. After reduction is complete (monitored by tlc), saturated sodium chloride is added until a precipitate forms. This is filtered and the crude product is oxidized in acetic acid using excess sodium dichromate to give 7-(1-tetrahydropyran-4'-yloxyethyl)-xanthone-2-carboxylic acid.

In like manner, the following compounds are prepared:
5-(1-4'-methoxytetrahydropyran-4'-yloxyethyl)-xanthone-2-carboxylic acid,
5-(1-tetrahydropyran-4'-yloxyethyl)-xanthone-2-carboxylic acid,
7-(1-4'-ethoxytetrahydropyran-4'-yloxyethyl)-xanthone-2-carboxylic acid,
5-(1-4'-ethoxytetrahydropyran-4'-yloxyethyl)-xanthone-2-carboxylic acid,
7-(1-4'-methoxytetrahydropyran-4'-yloxyisobutyl)-xanthone-2-carboxylic acid,
5-(1-4'-methoxytetrahydropyran-4'-yloxyisobutyl)-xanthone-2-carboxylic acid,
7-(1-tetrahydropyran-4'-yloxy-1-methylethyl)-xanthone-2-carboxylic acid,
5-(1-tetrahydropyran-4'-yloxy-1-methylethyl)-xanthone-2-carboxylic acid,
7-(1-4'-propoxytetrahydropyran-4'-yloxy-n-propyl)-xanthone-2-carboxylic acid, and
5-(1-4'-propoxytetrahydropyran-4'-yloxy-n-propyl)-xanthone-2-carboxylic acid.

EXAMPLE 22

A mixture of 4.5 g. of 7-acetylxanthone-2-carboxylic acid, 10 g. of methyl iodide, and 10 g. of lithium carbonate in 75 ml. of dimethylformamide is stirred at room temerpature for a period of 18 hours. After this period of time, the reaction mixture is poured into dilute hydrochloric acid-ice and the resultant precipitate is filtered off and washed to give methyl 7-acetylxanthone-2-carboxylate.

The foregoing procedure is repeated using the alternate lower alkyl iodides so as to prepare the corresponding lower alkyl acid esters hereof, e.g., ethyl 7-acetylxanthone-2-carboxylate, n-propyl 7-acetylxanthone-2-carboxylate, isopropyl 7-acetylxanthone-2-carboxylate, n-propyl 7-acetylxanthone-2-carboxylate, isobutyl 7-acetylxanthone-2-carboxylate, sec-butyl 7-acetylxanthone-2-carboxylate, t-butyl 7-acetylxanthone-2-carboxylate, n-pentyl 7-acetylxanthone-2-carboxylate, and so forth.

In like manner, the other xanthone-2-carboxylic acids thereof containing substitutents at the C-5 or C-7 positions, prepared as described above, can be converted to the corresponding acid esters.

EXAMPLE 23

To a solution of 10 g. of 7-acetylxanthone-2-carboxylic acid in 200 ml. of ethanol is added the theoretical amount of sodium hydroxide dissolved in 200 ml. of 90 percent ethanol. The reaction mixture is then concentrated in vacuum to give sodium 7-acetylxanthone-2-carboxylate.

Sodium 7-(1-hydroxyethyl)-xanthone-2-carboxylate and sodium 5-acetylxanthone-2-carboxylate are also thus prepared.

In a similar manner, the potassium and lithium salts are prepared. Similarly, by replacing the sodium salt by means of an appropriate metal salt reagent, e.g., calcium chloride, manganese chloride, and so forth, the other xanthone-2-carboxylic acid salts are prepared, e.g., magnesium 7-acetyl-xanthone-2-carboxylate, calcium 7-acetylxanthone-2-carboxylate, aluminum 7-acetylxanthone-2-carboxylate, ferrous 7-acetyl-xanthone-2-carboxylate, zinc 7-acetylxanthone-2-carboxylate, manganese 7-acetylxanthone-2-carboxylate, ferric 7-acetyl-xanthone-2-carboxylate, and so forth.

In a similar manner, the xanthone-2-carboxylic acid salts of the other C-5 or C-7 substituted xanthone-2-carboxylic acids hereof are prepared.

EXAMPLE 24

To a mixture of 50 ml. of concentrated aqueous ammonia in 500 ml. of methanol there are added 20 g. of 5-acetylxanthone-2-carboxylic acid. The resultant mixture is stirred for two hours and is then evaporated to dryness to give the ammonium salt of 5-acetylxanthone-2-carboxylic acid.

A solution of 10 g. of xanthone-2-carboxylic acid in 50 ml. of thionyl chloride is heated at reflux for 1 hour. Thereafter, the solution is evaporated to dryness to give the corresponding acid chloride to which is added a concentrated ethereal ammonia solution. The resultant solution is evaporated giving the ammonium salt of xanthone-2-carboxylic acid.

In like manner, the lower alkyl amides can be prepared using monoalkylamine or dialkylamine in lieu of ammonia in the above procedures. Thus prepared, e.g., are 7-propionylxanthone-2-carboxylic acid amide,
N-methyl 7-isobutylrylxanthone-2-carboxylic acid amide,
N,N-dimethyl 5-(1-hydroxyethyl)-xanthone-2-carboxylic acid amide,
N,N-diethyl 7-(1-hydroxy-1-methyl)-xanthone-2-carboxylic acid amide,
N-ethyl 7-benzoylxanthone-2-carboxylic acid amide,
N-n-propyl 7-furylxanthone-2-carboxylic acid amide, and so forth.

EXAMPLE 25

To a mixture of 20 g. of procaine and 500 ml. of aqueous methanol are added 20 g. of -carboxylic 7-isobutyrylxanthone-2carboxylic acid. The resultant mixture is stirred at room temperature for 16 hours. It is then evaporated under reduced pressure to give the procaine salt of 7-isobutyrylxanthone-2-carboxylic acid.

Similarly, the lysine, caffeine, and arginine salts thereof are obtained. In like manner, the e.g., procaine, lysine, caffeine, and arginine salts of the other 5- and 7-substituted xanthone-2-carboxylic acids are obtained, e.g., the procaine salt of 7-acetylxanthone-2-carboxylic acid, the caffeine salt of 5-(1-hydroxy-n-propyl)xanthone-2-carboxylic acid, the lysine salt of 7-hydroxymethylxanthone-2-carboxylic acid, the procaine salt of 5-hydroxymethylxanthone-2-carboxylic acid, and the arginine salt of 5-acetylxanthone-2-carboxylic acid.

EXAMPLE 26

The following procedures illustrate the method by which the pharmaceutical compositions of the compounds hereof are prepared.

Sodium chloride (0.44 g.) is dissolved in 80 ml. of a (9.47 g./l. water) sodium hydrogen phosphate solution. A sodium dihydrogen phosphate (8.00 g./l. water) solution (20 ml.) is then added thereto. The resultant solution having a pH of 7.38 is sterilized in an autoclave. This vehicle is then added to solid, dry xanthone-2-carboxylic acid to give a preparation suitable for intravenous injection containing 2.5 mg. of xanthone-2-carboxylic acid per ml. of total composition.

EXAMPLE 27

The following procedure illustrates a test procedure for the compounds hereof.

Normal female (Sprague-Dawley) rats of 150 to 200 grams each are passively sensitized intradermally by injection of rat anti-egg albumin reaginic sera. After 24 hours, each rat is challenged intravenously with 1.75 ml. of 0.4 percent Evans blue, 1 mg. egg albumin plus 10.0 mg. of xanthone-2-carboxylic acid. Control rats receive no xanthone-2-carboxylic acid. The dermal bluing is recorded 15 to 25 minutes later. The rats which receive the xanthone-2-carboxylic acid exhibit a 100 percent inhibition of allergic reaction whereas the control rats exhibit no inhibition.

The above procedure is repeated using 7-acetylxanthone-2-carboxylic acid, with similar results. The above procedure is repeated using oral administration, with similar results.

Xanthone-2-carboxylic acid compounds are administered by gavage at a dose of 20 mg. per animal 15 minutes prior to challenge. Twenty to 30 minutes after challenge the degree of dermal bluing is read, with similar results.

Inhibition of reaginic antigen-antibody reactions in rats is regarded as representative of inhibition of human reaginic antigen-antibody reactions which occur during allergic episodes.

Subjects challenged by antigen inhalation are measured for the extent of provoked degree of asthma condition by changes in airway resistance on expiration. The subject compounds are administered as an aerosol by inhalation before antigen challenge. Prevention of asthmatic conditions upon the administration of the compounds is evidence by a decrease in airway resistance and other subjective improvements, e.g., reduced cough.

What is claimed is:

1. A compound selected from those represented by the following formulas:

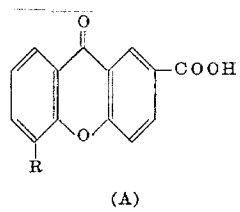 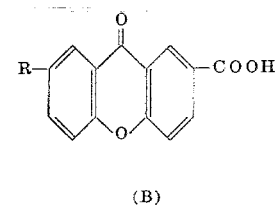

(A)　　　　　　　(B)

and the pharmaceutically acceptable, non-toxic alkyl or glycerol esters, unsubstituted, monoalkyl, dialkyl, dialkylaminoalkyl, alkoxyalkyl, or phenethyl substituted amides and salts thereof; wherein each R is a group of the formula:

in which $R^2$ is hydrogen; lower alkyl; cycloalkyl; phenyl; substituted phenyl in which the substituent is halo, lower alkyl, lower alkoxy, or lower alkylthio.

2. The compound according to claim 1 of formula (A).

3. The compound according to claim 2 wherein $R^2$ is lower alkyl.

4. The compound according to claim 2 wherein $R^2$ is hydrogen; 5-formylxanthrone-2-carboxylic acid.

5. The compound according to claim 2 wherein $R^2$ is cyclopropyl; 5-cyclopropylcarbonylxanthone-2-carboxylic acid.

6. The compound according to claim 2 wherein $R^2$ is methyl; 5-acetylxanthone-2-carboxylic acid.

7. The compound according to claim 1 of formula (B).

8. The compound according to claim 7 wherein $R^2$ is lower alkyl.

9. The compound according to claim 7 wherein $R^2$ is hydrogen; 7-formylxanthone-2-carboxylic acid.

10. The compound according to claim 7 wherein $R^2$ is cyclopropyl; 7-cyclopropylcarbonylxanthone-2-carboxylic acid.

11. The compound according to claim 7 wherein $R^2$ is methyl; 7-acetylxanthone-2-carboxylic acid.

12. The sodium salts of the compounds according to claim 1.

13. The salts according to claim 12 of formula (B).

14. The compound according to claim 13 which is sodium 7-acetylxanthone-2-carboxylate.

* * * * *

UNITED STATES PATENT OFFICE
CERTIFICATE OF CORRECTION

Patent No. 3,818,042 (Page 1)    Dated June 18, 1974

Inventor(s) JURG R. PFISTER, IAN T. HARRISON, JOHN H. FRIED

It is certified that error appears in the above-identified patent and that said Letters Patent are hereby corrected as shown below:

Column (4) line 30 Formula (4)

" 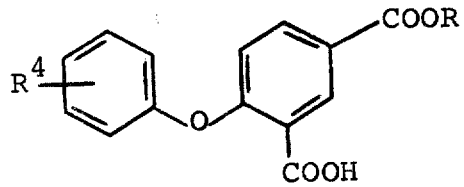 "

(4)     should read

--- 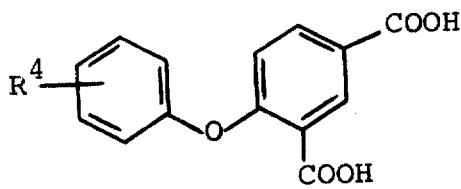 ---

(4)

Colume 7, line 10, "$R^1$ is $R^{1'}$" should read --- $R^{1'}$ is $R^1$ ---.
Column 9, line 60, that portion of formula (28), " 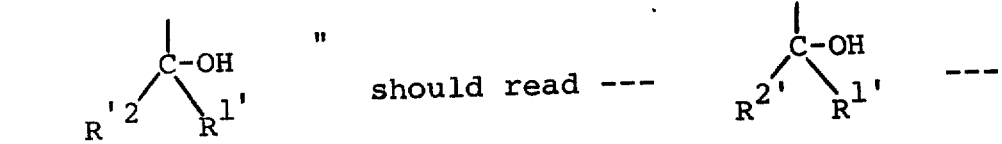

Column 13, line 36, "pyrazinyl, imidozolyl," should read --- pyrazinyl, pyrazolyl, imidozolyl, ---. Column 14, line 38, "7isobutyrylxantho-" should read --- 7-isobutyrylxantho- ---. Column 27, line 6, "5-(1-hydroxy-1-cyclohexylethyl)-" should read --- 5-(1-hydroxy-1-cyclohexylethyl)- ---. Column 34,

UNITED STATES PATENT OFFICE
CERTIFICATE OF CORRECTION

Patent No. 3,818,042    (Page 2)    Dated   June 18, 1974

Inventor(s)  JURG R. PFISTER, IAN T. HARRISON, JOHN H. FRIED

It is certified that error appears in the above-identified patent and that said Letters Patent are hereby corrected as shown below:

line 12, "temerpature" should read --- temperature ---. Column 35, lines 22-23, "carboxylic 7-isobutyrylxanthone-2carboxylic" should read --- 7-isobutyrylxanthone-2-carboxylic ---.

Signed and sealed this 15th day of July 1975.

(SEAL)
Attest:

RUTH C. MASON
Attesting Officer

C. MARSHALL DANN
Commissioner of Patents
and Trademarks